US010215855B2

(12) United States Patent
Decker et al.

(10) Patent No.: US 10,215,855 B2
(45) Date of Patent: Feb. 26, 2019

(54) COATINGS FOR INCREASING NEAR-INFRARED DETECTION DISTANCES

(71) Applicant: PPG Industries Ohio, Inc., Cleveland, OH (US)

(72) Inventors: Eldon L. Decker, Gibsonia, PA (US); Kristen Kruszewski, Pittsburgh, PA (US); LuAnn Holsing, Saxonburg, PA (US); Stephen G. McQuown, Cheswick, PA (US); Stuart D. Hellring, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/796,040

(22) Filed: Oct. 27, 2017

(65) Prior Publication Data

US 2018/0120435 A1    May 3, 2018

Related U.S. Application Data

(60) Provisional application No. 62/414,065, filed on Oct. 28, 2016.

(51) Int. Cl.
| | |
|---|---|
| *G01S 17/08* | (2006.01) |
| *C25D 13/00* | (2006.01) |
| *G01S 7/481* | (2006.01) |
| *B32B 33/00* | (2006.01) |
| *C09D 5/33* | (2006.01) |
| *G01S 17/93* | (2006.01) |
| *C09D 7/40* | (2018.01) |

(Continued)

(52) U.S. Cl.
CPC .............. *G01S 17/08* (2013.01); *B32B 33/00* (2013.01); *C09D 5/004* (2013.01); *C09D 5/38* (2013.01); *C09D 7/41* (2018.01); *C09D 7/70* (2018.01); *C09D 17/003* (2013.01); *C09D 17/006* (2013.01); *C09D 17/007* (2013.01); *C09D 17/008* (2013.01); *C25D 13/00* (2013.01); *G01S 7/481* (2013.01); *G01S 17/936* (2013.01)

(58) Field of Classification Search
CPC .......... G01S 17/08; G01S 7/481; C25D 13/00
See application file for complete search history.

(56) References Cited

U.S. PATENT DOCUMENTS

| | | |
|---|---|---|
| 4,157,924 A | 6/1979 | Elms et al. |
| 4,186,036 A | 1/1980 | Elms et al. |

(Continued)

*Primary Examiner* — David P Porta
*Assistant Examiner* — Djura Malevic
(74) *Attorney, Agent, or Firm* — Michael J. Grese

(57) ABSTRACT

A method for increasing a detection distance of a surface of an object illuminated by near-IR electromagnetic radiation, including: (a) directing near-IR electromagnetic radiation from a near-IR electromagnetic radiation source towards an object at least partially coated with a near-IR reflective coating that increases a near-IR electromagnetic radiation detection distance by at least 15% as measured at a wavelength in a near-IR range as compared to the same object coated with a color matched coating which absorbs more of the same near-IR radiation, where the color matched coating has a ΔE color matched value of 1.5 or less when compared to the near-IR reflective coating; and (b) detecting reflected near-IR electromagnetic radiation reflected from the near-IR reflective coating. A system for detecting proximity of vehicles is also disclosed.

22 Claims, 1 Drawing Sheet

(51) Int. Cl.
*C09D 5/38* (2006.01)
*C09D 17/00* (2006.01)
*C09D 7/41* (2018.01)

(56) References Cited

U.S. PATENT DOCUMENTS

| | | | |
|---|---|---|---|
| 4,598,020 A * | 7/1986 | Panush | C08K 9/02 |
| | | | 427/407.1 |
| 4,933,056 A | 6/1990 | Corrigan et al. | |
| 5,037,475 A | 8/1991 | Chida et al. | |
| 5,530,043 A | 6/1996 | Zawacky et al. | |
| 5,760,107 A | 6/1998 | Valko et al. | |
| 5,820,987 A | 10/1998 | Kaufman et al. | |
| 5,989,642 A | 11/1999 | Singer et al. | |
| 6,245,855 B1 | 6/2001 | Swarup et al. | |
| 6,306,505 B1 | 10/2001 | Mauer et al. | |
| 6,356,376 B1 * | 3/2002 | Tonar | B60Q 1/2665 |
| | | | 359/265 |
| 6,366,397 B1 | 4/2002 | Genjima et al. | |
| 6,387,519 B1 | 5/2002 | Anderson et al. | |
| 6,700,692 B2 | 3/2004 | Tonar | B60Q 1/2665 |
| | | | 359/265 |
| 7,005,472 B2 | 2/2006 | Anderson et al. | |
| 7,241,500 B2 * | 7/2007 | Shiao | E04D 5/12 |
| | | | 428/402 |
| 7,466,415 B2 * | 12/2008 | Gibson | B01F 13/1055 |
| | | | 356/402 |
| 7,663,798 B2 * | 2/2010 | Tonar | B60Q 1/2665 |
| | | | 359/265 |
| 7,959,981 B2 | 6/2011 | Sadvary et al. | |
| 8,108,169 B2 * | 1/2012 | Martin | G01J 3/46 |
| | | | 118/712 |
| 8,123,850 B2 * | 2/2012 | Niewold | C09C 1/42 |
| | | | 106/472 |
| 8,129,466 B2 | 3/2012 | Polk et al. | |
| 8,679,617 B2 | 3/2014 | Eibon et al. | |
| 8,784,941 B2 | 7/2014 | Richter et al. | |
| 8,822,025 B2 | 9/2014 | Decker et al. | |
| 8,835,008 B2 | 9/2014 | Richter et al. | |
| 9,056,584 B2 * | 6/2015 | Fish, Jr. | B60R 1/025 |
| 9,056,988 B2 * | 6/2015 | Decker | B05D 7/54 |
| 9,057,835 B2 | 6/2015 | Hellring et al. | |
| 9,482,657 B2 * | 11/2016 | Bell | G01N 33/32 |
| 9,880,263 B2 * | 1/2018 | Droz | G01S 7/4802 |
| 2002/0154379 A1 * | 10/2002 | Tonar | B60Q 1/2665 |
| | | | 359/267 |
| 2004/0191540 A1 | 9/2004 | Jakobi et al. | |
| 2005/0007645 A1 * | 1/2005 | Tonar | B60Q 1/2665 |
| | | | 359/265 |
| 2006/0118408 A1 * | 6/2006 | Myli | C03C 17/22 |
| | | | 204/192.26 |
| 2008/0187708 A1 * | 8/2008 | Decker | B05D 5/061 |
| | | | 428/98 |
| 2009/0098476 A1 | 4/2009 | Denton et al. | |
| 2010/0047620 A1 * | 2/2010 | Decker | B05D 7/54 |
| | | | 428/688 |
| 2010/0110553 A1 * | 5/2010 | Anderson | B60R 1/088 |
| | | | 359/603 |
| 2010/0277786 A1 * | 11/2010 | Anderson | B60R 1/088 |
| | | | 359/247 |
| 2010/0321758 A1 * | 12/2010 | Bugno | B60R 1/088 |
| | | | 359/267 |
| 2012/0270986 A1 * | 10/2012 | Maruyama | C09D 5/004 |
| | | | 524/413 |
| 2013/0170013 A1 * | 7/2013 | Tonar | B60R 1/088 |
| | | | 359/296 |
| 2013/0336525 A1 * | 12/2013 | Kurtz | B41M 3/10 |
| | | | 382/103 |
| 2015/0004424 A1 * | 1/2015 | Kruesemann | C09D 7/41 |
| | | | 428/523 |
| 2015/0329054 A1 * | 11/2015 | Neuman | B60R 1/025 |
| | | | 359/267 |
| 2016/0291134 A1 * | 10/2016 | Droz | G01S 7/4802 |
| 2017/0068143 A1 * | 3/2017 | Bruizeman | B60R 1/025 |
| 2017/0261830 A1 * | 9/2017 | Luten | B60R 1/025 |

* cited by examiner

COATINGS FOR INCREASING NEAR-INFRARED DETECTION DISTANCES

CROSS REFERENCE TO RELATED APPLICATIONS

This application claims priority to U.S. Provisional Application Ser. No. 62/414,065, filed Oct. 28, 2016, which is hereby incorporated by reference in its entirety.

FIELD OF THE INVENTION

The present invention also relates to methods and systems for increased near-IR detection distance of an object coated with a near-IR reflective coating.

BACKGROUND OF THE INVENTION

Recent advances have been made in technologies related to self-driving ("autonomous") vehicles and other objects in a vehicle's surroundings including markings that are detectable by a sensor mounted on the autonomous vehicle. Autonomous vehicles use a combination of detecting systems, such as sensors, cameras, radar, ultrasonic, and lasers to detect and locate obstacles such that the autonomous vehicle can safely navigate around such objects. Some detecting systems are limited in their ability to detect objects at long distances or in non-ideal environments, such as in low-light conditions, in inclement weather, such as fog, rain, and snow, or in other conditions with light scattering particulates in the air (e.g., smog and dust). Such limitations may prohibit the autonomous from safely navigating obstacles. New detection systems that can increase the detection distance and produce detectable signals in non-ideal environments are desirable.

SUMMARY OF THE INVENTION

The present invention is directed to a method for increasing a detection distance of a surface of an object illuminated by near-IR electromagnetic radiation, including: (a) directing near-IR electromagnetic radiation from a near-IR electromagnetic radiation source towards an object at least partially coated with a near-IR reflective coating that increases a near-IR electromagnetic radiation detection distance by at least 15% as measured at a wavelength in a near-IR range as compared to the same object coated with a color matched coating which absorbs more of the same near-IR radiation, where the color matched coating has a ΔE color matched value of 1.5 or less when compared to the near-IR reflective coating, as measured using an integrating sphere with D65 Illumination, 10° observer with specular component included; and (b) detecting reflected near-IR electromagnetic radiation reflected from the near-IR reflective coating.

The present invention is also directed to a system for detecting proximity of vehicles, including: a first vehicle at least partially coated with a near-IR reflective coating that increases a near-IR electromagnetic radiation detection distance by at least 15% as measured at a wavelength in a near-IR range between the first vehicle and a second vehicle as compared to the first vehicle coated with a color matched coating which absorbs more of the near-IR radiation. The color matched coating has a ΔE color matched value of 1.5 or less when compared to the near-IR reflective coating, as measured using an integrating sphere with D65 Illumination, 10° observer with specular component included.

The present invention is also directed to a system for detecting the proximity of a first vehicle to a second vehicle, including: (a) a first vehicle at least partially coated with a near-IR reflective coating that increases a near-IR electromagnetic radiation detection distance by at least 15% as measured at a wavelength in a near-IR range as compared to a vehicle coated with a similar color matched coating which absorbs more of the near-IR radiation, where the similar color matched coating has a ΔE color matched value of 1.5 or less when compared to the near-IR reflective coating, as measured using an integrating sphere with D65 Illumination, 10° observer with specular component included; and (b) a second vehicle including: (i) a near-IR electromagnetic radiation source that directs near-IR electromagnetic radiation towards the first vehicle; (ii) a near-IR detector that detects near-IR electromagnetic radiation reflected from the first vehicle; and (iii) a computing device that determines the detection distance between the first vehicle and second vehicle based in part on the detected near-IR electromagnetic radiation reflected from the first vehicle.

DETAILED DESCRIPTION OF THE INVENTION

Figure 1:
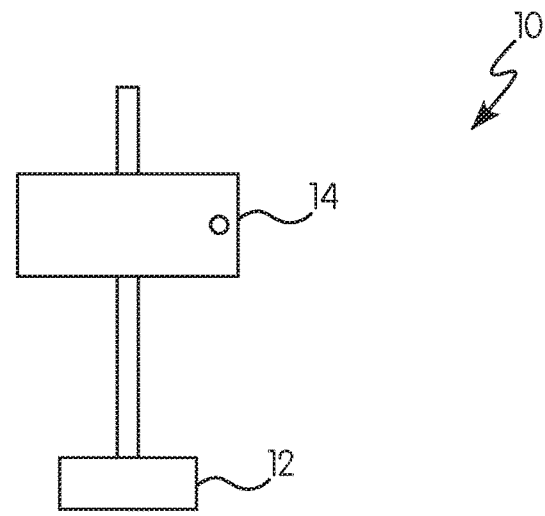
FIG. 1 is graphic representation of a front view of a near-IR reflective coated test panel secured to a mount.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and the plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" object, "a" pigment, and the like refer to one or more of these items. Also, as used herein, the term "polymer" may refer to prepolymers, oligomers, and both homopolymers and copolymers. The term "resin" is used interchangeably with "polymer."

As used herein, the transitional term "comprising" (and other comparable terms, e.g., "containing" and "including") is "open-ended" and is used in reference to compositions, methods, and respective component(s) thereof that are essential to the invention, yet open to the inclusion of unspecified matter.

The present invention is directed to methods for increasing a detection distance of a surface of an object illuminated by near-infrared (near-IR) electromagnetic radiation. Such methods may include the following steps: (a) directing near-IR electromagnetic radiation from a near-IR electromagnetic radiation source towards an object at least partially coated with a near-IR reflective coating that increases a near-IR electromagnetic radiation detection distance by at least 15% as measured at a wavelength in a near-IR range as compared to the same object coated with a color matched coating which absorbs more of the same near-IR radiation, wherein the color matched coating has a $\Delta E$ color matched value of 1.5 or less when compared to the near-IR reflective coating, as measured using an integrating sphere with D65 Illumination, 10° observer with specular component included; and (b) detecting reflected near-IR electromagnetic radiation from the near-IR reflective coating.

As used herein, the term "object" refers to a vehicle, road, road traffic safety product, signage, building, structure and any obstacle that may be located in a path of a moving vehicle. Road traffic safety products may include barriers, barricades, speed bumps, traffic cones, and the like. Vehicles may include any type of moving vehicle, such as automobiles, bicycles, trucks, buses, airplanes, boats, and the like. The vehicle may be autonomously operated. The object may be clothing, such as clothing worn by an individual in the path of a vehicle. It is to be understood that objects may include any type of obstacles that may be located in the path of any of the types of vehicles.

As used herein, the term "near-IR" or "infrared radiation" or "NIR" refers to electromagnetic radiation in the near-IR range of the electromagnetic spectrum. Such near-IR electromagnetic radiation may have a wavelength from 700 nm to 2500 nm, such as 900-1600 nm, such as 905 nm, or such as 1550 nm.

The near-IR electromagnetic radiation source that may be used in the present invention includes, without limitation, light emitting diodes (LEDs), laser diodes or any light source that is capable of emitting electromagnetic radiation having a wavelength from 700 nm to 2500 nm (in the near-IR range). The near-IR electromagnetic radiation source may be used in an imaging LIDAR (Light Imaging, Detection and Ranging) system. The imaging LIDAR system may utilize lasers to generate electromagnetic radiation with a wavelength from 700-2500 nm, such as from 900-1600 nm. The LIDAR system may utilize lasers to generate electromagnetic radiation with a wavelength of 905 nm, 1550 nm, or any other suitable wavelength in the near-IR range.

A near-IR detector may be a semiconductor detector that is capable of sensing near-IR radiation. Such near-IR detectors may include a photodiode or an image sensor. The near-IR detector may be coupled in the same housing unit with the near-IR electromagnetic radiation source, such as a LIDAR system that houses both the near-IR source and the detector. Alternatively, the near-IR detector may be in a separate housing from the near-IR electromagnetic source.

Typically, the near-IR detector and the near-IR source are coupled to the same vehicle to detect obstacles in the pathway of the vehicle, including an autonomous vehicle. The LIDAR device may also include a computing system for calculating the distance the near-IR electromagnetic radiation travels to an object that is capable of reflecting such electromagnetic radiation. The present invention may include one near-IR detector or a plurality of near-IR detectors. The present invention may include a first near-IR detector capable of detecting near-IR electromagnetic radiation having a first wavelength and a second near-IR detector capable of detecting near-IR electromagnetic radiation having a second wavelength, where the first and second wavelengths are different wavelengths, as such the first wavelength has a shorter wavelength than the second wavelength.

According to the present invention the object may be at least partially coated with a near-IR reflective coating. The near-IR reflective coating may be a single layer or a multilayer coating system, such as a coating system including at least two coating layers, a first coating layer and a second coating layer underneath at least a portion of the first coating layer (second coating layer underlies at least a portion of the first coating layer). The first coating layer may be substantially transparent to near-IR radiation. The second coating layer may reflect near-IR radiation. In addition, the near-IR reflective coating system may include additional coating layers in addition to the first coating layer and the second coating layer.

The near-IR reflective coating of the present invention may be deposited onto any of the previously described objects. The present invention may provide a near-IR reflective coating being applied to at least 10% of an exterior surface area of an object, such as at least 20%, such as at least 50%, at least 70%, or at least 90%.

The near-IR reflective coating of the present invention may be applied to any substrates known in the art. These substrates may be, for example, metallic or non-metallic. Metallic substrates may include tin, aluminum, steel, such as, tin-plated steel, chromium passivated steel, galvanized steel, or coiled steel, or other coiled metal, and any metallic alloys thereof. Non-metallic substrates may be polymeric, such as plastic, including polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), or polyamide. Other suitable non-metallic substrates may include wood, veneer, wood composite, particle board, medium density fiberboard, cement, stone, glass, ceramic, asphalt, and the like.

The substrate may be a pretreated metal substrate (such as is mentioned above) and may be coated with an electrodeposited coating. Suitable electrodepositable coating compositions have been described in U.S. Pat. Nos. 4,933,056, 5,530,043, 5,760,107, and 5,820,987, incorporated herein by reference. After the electrodeposited coating composition is cured, a primer-surfacer coating may be applied onto at least a portion of the electrodeposited coating. The primer-surfacer coating may be applied to the electrodeposited coating and cured prior to subsequent application of another coating.

The primer-surfacer coating may enhance chip resistance of subsequently applied coating layers, and may enhance the appearance of the subsequently applied coating layers. The second coating layer of the present invention may be a previously-described primer-surfacer coating or a sealer. In some examples, the first coating layer of the coating system may be a color-imparting basecoat that is deposited onto at least a portion of the primer-surfacer coating or sealer layer (the second coating layer).

The near-IR reflective coating of the present invention may further include a substantially clear coating (e.g., a clearcoat or top-coat). The clearcoat may be positioned over at least a portion of the first coating layer. As used herein, the term "substantially clear" refers to a coating that is substantially transparent and not opaque. The clearcoat may include a colorant; however, in such cases, the colorant is not present in an amount sufficient to render the coating opaque. Clearcoats described in, for example, U.S. Pat. Nos. 5,989,642, 6,245,855, 6,387,519, and 7,005,472, incorporated by reference herein, may be used in the coating systems of the present invention. In certain examples, the clearcoat may include particles, such as silica particles, that are dispersed in the clearcoat (such as at the surface of the clearcoat).

The first coating layer (which may be the color-imparting basecoat as described above) may also be the clearcoat or top-coat described above, such that a single layer serves as a color-imparting basecoat and the clearcoat over the second coating layer (primer layer). Thus, an additional clearcoat overtop of the first coating layer may not be included, and the first coating layer may serve as the top-coat of the near-IR reflective coating system. This may be the case in automotive refinish applications in which the coating layer applied over the primer-surfacer layer (second coating layer) may be a combined color basecoat and clearcoat (in a single layer).

The near-IR reflective coating of the present invention (such as the first coating layer of the multilayer coating) may exhibit a CIELAB L* value of no more than 35, such as no more than 30, or no more than 28. For purposes of the present invention, CIELAB L* values are measured using an integrating sphere with D65 Illumination, 10° observer with specular component included. The L*, a*, b*, C*, h°, and ΔE CIELAB values reported herein are determined using an integrating sphere with D65 Illumination, 10° observer with specular component included according to ASTM 308 unless otherwise stated.

The first coating layer of the near-IR reflective coating system of the present invention may include: (a) a film-forming resin; and (b) a visibly-absorbing near-IR transparent pigment and/or dye (or other colorant). As used herein, the term "film-forming resin" may refer to a resin that can form a self-supporting continuous film on at least a horizontal surface of a substrate upon removal of any diluents or carriers present with the film-forming resin or upon curing at ambient or elevated temperature.

Film-forming resins that may be used in the first coating layer include, without limitation, those used in automotive OEM coating compositions, automotive refinish coating compositions, industrial coating compositions, architectural coating compositions, coil coating compositions, packaging coating compositions, protective and marine coating compositions, and aerospace coating compositions, among others.

The film-forming resin included within the near-IR reflective coatings described herein may include a thermosetting film-forming resin. As used herein, the term "thermosetting" refers to resins that "set" irreversibly upon curing or cross-linking, where the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or cross-linked, a thermoset resin will not melt upon the application of heat and is insoluble in conventional solvents. In other examples, the film-forming resin included within the coatings described herein may include a thermoplastic resin. As used herein, the term "thermoplastic" refers to resins that include polymeric components that are not joined by covalent bonds and thereby can undergo liquid flow upon heating and are soluble in conventional solvents.

The near-IR reflective coatings described herein may include any of a variety of thermoplastic and/or thermosetting compositions known in the art. The near-IR reflective coatings may be deposited from water-based or solvent-based liquid compositions, or, alternatively, a composition in solid particulate form (e.g., a powder coating).

Thermosetting coating compositions typically include a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

Thermosetting or curable coating compositions typically include film forming resins having functional groups that are reactive with the crosslinking agent. The film-forming resin in the coatings described herein may be selected from any of a variety of polymers well-known in the art. The film-forming resin may be selected from, for example, acrylic polymers, polyester polymers, polyurethane polymers, polyamide polymers, polyether polymers, polysiloxane polymers, copolymers thereof, and mixtures thereof. Generally these polymers may be any polymers of these types made by any method known to those skilled in the art. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

Appropriate mixtures of film-forming resins may also be used in the preparation of the near-IR reflective coatings described herein.

The first coating layer in the near-IR reflective coating systems of the present invention may include a visibly-absorbing near-IR transparent pigment and/or dye.

As used herein, the term "near-IR transparent pigment and/or dye" may refer to a pigment and/or dye that is substantially transparent in the near-IR range (700 to 2500 nm), such as is described in U.S. Patent Application Publication No. 2004/0191540 at [0020]-[0026], the cited portion of which is incorporated herein by reference, without appreciable scattering or absorption of radiation in such wavelengths. In certain examples, the near-IR transparent pigment and/or dye may have an average transmission of at least 70% in the near-IR wavelength region. As used herein, the term "visibly-absorbing" refers to a pigment and/or dye that substantially absorbs radiation in at least some wavelengths within the visible region of 400 to 700 nm.

Non-limiting examples of suitable visibly-absorbing near-IR transparent pigments may include, for example, copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, isoindoline pigment, diarylide yellow pigment, brominated anthranthrone pigment, azo metal complex pigment, and the like. Combinations of the visibly-absorbing near-IR transparent pigments may be used.

The near-IR transparent pigment may include a near-IR transparent black pigment, such as those that rely in part upon a perylene type structure, that is illustrated below:

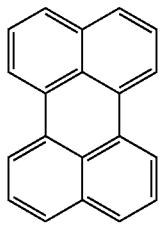 [SMILES: c1cc2cccc3c4cccc5cccc(c(c1)c23)c54]

Commercially available examples of such pigments include PALIOGEN® Black EH 0788, PALIOGEN® Black L0086, and PALIOGEN® Black S0084, commercially available from BASF Corporation (Ludwigshafen, Germany). Further examples of near-IR transparent black pigments that are suitable for use in certain embodiments of the present invention are described in U.S. Patent Application Publication No. 2009/0098476 at [0030] to [0034], the cited portion of which is incorporated by reference herein, and includes those having a perylene isoindolene structure, an azomethine structure, and/or an aniline structure.

The near-IR transparent pigment and/or dye may be present in the composition from which the first coating layer is deposited in an amount of at least 0.5% by weight, such as at least 1% by weight, or at least 5% by weight, based on the total solids weight of the composition. The near-IR transparent pigment and/or dye may be present in the composition from which the first coating layer is deposited in an amount of less than 20% by weight, such as less than 15% by weight, or less than 10% by weight, based on the total solids weight of the composition. A range of the amount of near-IR transparent pigment and/or dye present in such compositions may include any combinations of these values, inclusive of the recited values, such as 0.5-20%, 1-15%, or 5-10% by weight based on the total solids weight of the composition.

The first coating layer, as well as the second coating layer, may be substantially free, or, in some cases, completely free, of carbon black. As used in this application, the term "substantially free", when used with reference to the amount of carbon black in a coating composition, means that carbon black is present in the composition in an amount of no more than 0.1% by weight, no more than 0.05% by weight, or no more than 0.02% by weight, based on the total solids weight of the composition. As used herein, the term "completely free", when used with reference to the amount of carbon black in a coating composition, means that carbon black is not present in the composition at all.

If desired, the first coating layer and/or the second coating layer may include other optional materials well known in the art of formulating surface coatings, such as plasticizers, anti-oxidants, hindered amine light stabilizers, UV light absorbers and stabilizers, surfactants, flow control agents, thixotropic agents such as bentonite clay, pigments, fillers, organic co-solvents, catalysts, including phosphonic acids, and other customary auxiliaries.

The near-IR reflective coating systems of the present invention may further include a second coating layer underlying at least a portion of the first coating layer. In some examples, the second coating layer may include: (a) a film-forming resin; (b) a near-IR reflective pigment, such as titanium dioxide pigment or a thin flake metal or metal alloy near-IR reflective pigment; and optionally (c) a visibly-absorbing near-IR transparent pigment and/or dye (or other colorant). The film forming resin and visibly-absorbing near-IR transparent pigment and/or dye may include, for example, any of those described earlier with respect to the first coating layer. In some examples, the film forming resin and/or visibly-absorbing near-IR transparent pigment and/or dye present in the second coating layer may be the same as the film-forming resin and/or visibly-absorbing near-IR transparent pigment and/or dye present in the first coating layer. In some examples, the film-forming resin and/or visibly-absorbing near-IR transparent pigment and/or dye present in the second coating layer may be different from the film-forming resin and/or visibly-absorbing near-IR transparent pigment and/or dye present in the first coating layer.

As used herein, the terms "near-IR reflective pigment" may refer to a pigment that, when included in a coating composition, provides a cured coating with a reflectance of near-IR radiation greater than a cured coating deposited in the same manner from the same composition but without the near-IR reflective pigment.

Suitable examples of thin flakes of metal or metal alloy near-IR reflective pigments may include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and aluminites, iron oxide, iron cobalt ferrite, iron titanium, zinc ferrite, zinc iron chromite, copper chromite, as well as combinations thereof.

In the present invention, such pigments may be in the form of thin flakes. For example, "leafing" aluminum flakes are often suitable. As used herein, the term "thin flake" means that a particle has a ratio of its width to its thickness (termed aspect ratio) that is at least 2 and often falls in the range of 10 to 2,000, such as 3 to 400, or, in some cases, 10 to 200, including 10 to 150. As such, a "thin flake" particle is one that has a substantially flat structure. Such flakes may have a coating deposited thereon, such as is the case with silica coated copper flakes.

Such thin flake particles may have a thickness of less than 0.05 microns to 10 microns, such as 0.5 to 5 microns. In certain examples, such thin flake particles have a maximum width of 10 to 150 microns, such as 10 to 30 microns.

The second coating layer may include thin flake particles having rounded edges and a smooth and flat surface, as opposed to jagged edges. Flakes having angular edges and uneven surfaces are known in the art as "cornflakes". On the other hand, flakes distinguished by more rounded edges and smoother, flatter surfaces are referred to as "silver dollar" flakes. Moreover, in certain examples, the thin flake metal or metal alloy particles having rounded edges may have a maximum width of no more than 25 microns, such as 10 to 15 microns, when measured according to ISO 1524.

Additional suitable thin flake metal or metal alloy near-IR reflective pigments may include colored metallic pigments, such as those in which a coloring pigment is chemically adsorbed on the surface of a metallic pigment. Such colored metallic pigments are described in U.S. Pat. No. 5,037,745 at col. 2, line 55 to col. 7, line 54, the cited portion of which is incorporated herein by reference. Some such colored metallic pigments are also commercially available and include those available from U.S. Aluminum, Inc. (Flemington, N.J.) under the tradename FIREFLAKE®. Near-IR transparent pigments, such as the perylene-based pigments described below, may be chemically adsorbed on the surface of the metallic pigment, to provide a dark, sometimes black, colored near-IR reflective metallic pigment.

The thin flake metal or metal alloy near-IR reflective pigments may be present in the compositions from which the second coating layer is deposited in an amount of at least 1% by weight, such as at least 2%, at least 3%, at least 5%, at least 6%, or at least 10% by weight, based on the total solids weight of the composition. In some cases, the near-IR reflective pigment can be present in the foregoing coating compositions in an amount of no more than 50% by weight, such as no more than 25%, or no more than 15% by weight, based on the total solids weight of the composition. A range of the amount of thin flake metal or metal alloy near-IR reflective pigments present in such compositions may include any combinations of these values, inclusive of the recited values, such as 1-25%, 5-25%, or 10-15% by weight based on the total solids weight of the composition.

The second coating layer may include near-IR reflective pigments in addition to or in lieu of the thin flake metal or metal alloy near-IR reflective pigments described earlier. Such additional near-IR reflective pigment may be colored or essentially colorless, translucent or opaque. As used herein, the term "essentially colorless" means that the pigment does not have a color, e.g., the absorption curve for the pigment is devoid of absorption peaks in the 400-700 nm range and does not present a tint or hue in reflected or transmitted light when viewed under sunlight. A colored near-IR reflective pigment may be a near-IR reflective pigment that is not essentially colorless. Stated differently, a "colored" near-IR reflective pigment is one that may be visibly-absorbing, as defined below. A "translucent" pigment means that visible light is able to pass through the pigment diffusely. An "opaque" pigment is one that scatters significant amounts of light. One example of a near-IR reflective pigment that can be translucent and essentially colorless (if used in small enough amounts in a coating) is SOLARFLAIR® 9870 pigment commercially available from Merck KGaA (Darmstadt, Germany). This commercially available pigment may also be an example of an interference pigment (described below) that has a mica substrate that is coated with titanium dioxide.

Examples of suitable colored and/or opaque near-IR reflective pigments include, for example, any of a variety of metals and metal alloys, inorganic oxides, and interference pigments. Exemplary colors include, for example: white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; and blue and violet, as is the case with certain $TiO_2$ coated mica flakes.

Suitable inorganic oxide containing near-IR reflective pigments include, for example, iron oxide, titanium oxide ($TiO_2$) pigment, composite oxide system pigments, titanium oxide-coated mica pigment, iron oxide-coated mica pigment, and zinc oxide pigment, among many others.

In one non-limiting example, the second coating layer may include: (a) a film forming resin; (b) a plurality of near-IR transparent pigments and/or dyes dispersed in the film forming resin; and (c) a near-IR reflective pigment dispersed in the film forming resin. In this example, the near-IR transparent pigments and/or dyes may include any of the previously-disclosed visibly-absorbing near-IR transparent pigments and/or dyes. The second coating layer may include a plurality of near-IR transparent pigments and/or dyes. The plurality of near-IR transparent pigments and/or dyes may include a first perylene pigment and a second perylene pigment different from the first perylene pigment. The near-IR reflective pigment may be different from the first perylene pigment and the second perylene pigment. The second coating layer in this example may be substantially free of carbon black and may exhibit an off-white or grey color. In this example, substantially free means less than or equal to 0.02% by weight, based on the total solids weight of the composition.

In this example, the perylene pigment may be any of the previously-described perylene pigments. The coating composition may include a perylene pigment according to formula (a) or (b):

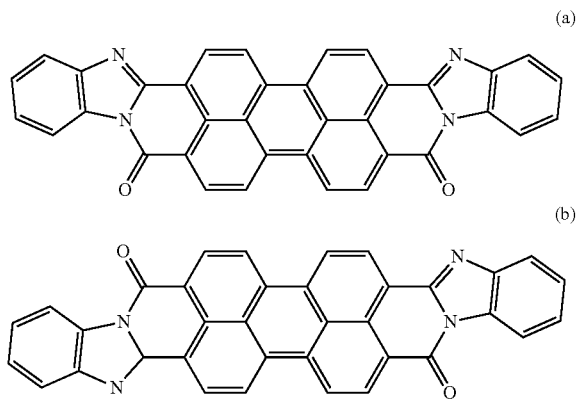

Such pigments are commercially available as PALIOGEN® Black EH 0788 and PALIOGEN® Black EH 0788 from BASF Corporation.

The coating composition may include a perylene pigment according to formula (c):

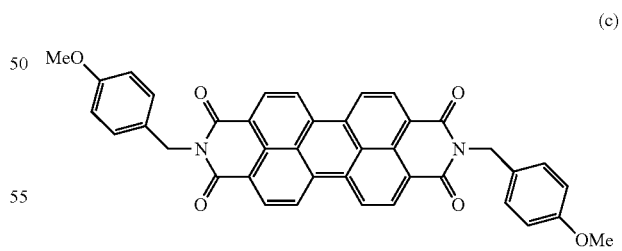

Such perylene pigment is also known as "CI Pigment Black 32" and is commercially available as PALIOGEN® Black L 0086 from BASF Corporation.

With continued reference to this example, the first perylene pigment may be a green-shade perylene pigment, and the second perylene pigment may be a purple-shade perylene pigment.

The green-shade perylene pigment, when utilized alone at a high enough concentration and applied at a suitable dry film thickness, may appear black to the human eye. However, when the green-shade perylene pigment is utilized in combination with titanium dioxide in a coating composition (e.g., the same layer of a multilayer coating composition), the coating composition appears to be a green-shade to the human eye. Green-shade means exhibiting CIELAB values using an integrating sphere with D65 Illumination, 10° observer with specular component included of: $L^*$ of 40-95 and $h°$ of 275-325.

The purple-shade perylene pigment, when utilized alone at a high enough concentration and applied at a suitable dry film thickness, may appear black to the human eye. However, when the purple-shade perylene pigment is utilized in combination with titanium dioxide in a coating composition (e.g., the same layer of a multilayer coating composition), the coating composition appears to be a purple-shade to the human eye. Purple-shade means exhibiting CIELAB values using an integrating sphere with D65 Illumination, 10° observer with specular component included of: $L^*$ of 40-95 and $h°$ of 170-200.

In this example, the second coating layer may exhibit the following CIELAB values using an integrating sphere with D65 Illumination, 10° observer with specular component included: a $L^*$ value ranging from 40-95; an $a^*$ value ranging from −2 to 2; and a $b^*$ value ranging from −6 to 6, which may be considered an off-white or gray color.

With continued reference to this example, the near-IR reflective pigment may be titanium dioxide in powder form, which may be dispersed in the film-forming resin. The second coating layer may fully hide a surface of the object (or the coating layer over which it is applied) at a dry film thickness of less than or equal to 2.5 mils (63.5 microns), such as less than or equal to 2.0 mils (50.8 microns), or less than or equal to 1.5 mils (38.1 microns), according to ASTM D6762 using Lenata black and white hiding strips. The second coating layer in this example may have a total solar reflectance of at least 45% as measured in accordance with ASTM E903-12, such as at least 50%, at least 60%, at least 65%, at least 70%, at least 75%, or at least 80%.

In another non-limiting example, the second coating layer may include: a film-forming resin; a plurality of colorants dispersed in the film-forming resin, the plurality of colorants comprising a near-IR transparent pigment or dye, wherein the near-IR transparent pigment or dye comprises a first near-IR transparent pigment or dye and a second near-IR transparent pigment or dye different from the first near-IR transparent pigment or dye; and a near-IR reflective pigment dispersed in the film-forming resin, the near-IR reflective pigment different from the first near-IR transparent pigment or dye and the second near-IR transparent pigment or dye, wherein the second coating layer exhibits an off-white or grey color, and wherein the second coating layer is substantially free of carbon black.

In this example, the film-forming resin may be any of the previously described resins.

In this example, the colorant may include pigments, dyes, tints, and/or some combination thereof, such as those used in the paint industry and/or listed in the Dry Color Manufacturers associate (DCMA), as well as any special effect compositions. A colorant, as used in this application, may include, for example, a finely divided solid powder that is insoluble but wettable under the conditions of use. A colorant may be organic or inorganic and may be agglomerated or non-agglomerated. Colorants may be incorporated into a coating layer (such as the second coating layer) by grinding or simple mixing. Colorants may be incorporated by grinding into a coating layer (such as the second coating layer) by use of a grind vehicle, such as an acrylic grind vehicle, the use of which will be familiar to one skilled in the art. The colorant may be added to a coating layer (such as the second coating layer) in any suitable form, such as discrete particles, dispersions, solutions, and/or flakes. The colorant may be present in a coating layer (such as the second coating layer) in any amount sufficient to impart the desired property, visual, and/or color effect.

In this example, the first near-IR transparent pigment or dye and the second near-IR transparent pigment or dye of the colorant may be any of the near-IR transparent pigments or dyes previously disclosed herein. The near IR-reflective pigment may be any of the near-IR reflective pigments previously disclosed herein.

As used in this application, the term "interference pigment" refers to a pigment having a multi-layer structure having alternating layers of material of different refractive index. Suitable light-interference pigments include, for example, pigments comprising a substrate of, for example, mica, $SiO_2$, $Al_2O_3$, $TiO_2$, or glass that is coated with one or more layers of, e.g., titanium dioxide, iron oxide, titanium iron oxide or chrome oxide or combinations thereof, or pigments comprising combinations of metal and metal oxide, such as aluminum coated with layers of iron oxide layers and/or silicon dioxide.

The near-IR reflective coating system of the present invention may also include the incorporation of at least one near-IR fluorescent pigment and/or dye (the first and/or the second layer include at least one near-IR fluorescent pigment and/or dye). As used herein, the term "near-IR fluorescent pigment" may refer to a pigment that can absorb electromagnetic radiation in the visible region (400 to 700 nm) and fluoresce in the near-IR region (700 to 2500 nm). Examples of suitable near-IR fluorescent pigments include metallic pigments, metal oxides, mixed metal oxides, metal sulfides, metal selenides, metal tellurides, metal silicates, inorganic oxides, inorganic silicates, alkaline earth metal silicates. As used herein, the term "alkaline" refers to the elements of group II of the periodic table Be, Mg, Ca, Sr, Ba, and Ra (beryllium, magnesium, calcium, strontium, barium, radium). Non-limiting examples of suitable near-IR fluorescent pigments include metal compounds, which may be doped with one or more metals, metal oxides, alkali and/or rare earth elements. As used herein, the term "alkali" refers to the elements of group I of the periodic table Li, Na, K, Rb, Cs, and Fr (lithium, sodium, potassium, rubidium, cesium, francium). As used herein, the term "rare earth element" refers to the lanthanide series of elements La, Ce, Pr, Nd, Pm, Sm, Eu, Gd, Tb, Dy, Ho, Er, Tm, and Yb (lanthanum, cerium, praseodymium, neodymium, promethium, samarium, europium, gadolinium, terbium, dysprosium, holmium, erbium, thulium, and ytterbium).

More particularly, examples of near-IR fluorescent pigments may include Egyptian blue ($CaCuSi_4O_{10}$), Han blue ($BaCuSi_4O_{10}$), Han purple ($BaCuSi_2O_6$), $SrCuSi_4O_{10}$, Ruby ($Al_2O_3$:Cr). In particular, blue alkali earth copper silicates, such as Egyptian blue ($CaCuSi_4O_{10}$) fluoresce in the 800 to 1200 nm region. Cadmium pigments, CdSe and CdTe compounds, "zirconia" red (red cadmium pigments coated with a zirconium silicate glass), indigo, blue verditer ($2CuCO_3.Cu(OH)_2$), copper blue, azurite ($Cu_3(CO_3)_2(OH)_2$), Ploss blue (($CuCa)(CH_3COO)_2.2H_2O$), and smalt ($CoO.K.Si$) may possess fluorescence.

Other examples of near-IR fluorescent pigments may include ZnO, ZnS, ZnSe, and ZnTe, which have energy gaps that may be too large for band-to-band emission of near-IR energy, but doping with Sn, Mn, and Te may lead to suitable impurity luminescence. Other examples of near-IR fluorescent pigments may include compounds used in lighting and for fluorescent displays; certain direct bandgap semiconductors, such as (Al,Ga)As, InP, and the like; and materials used for solid state lasers, such as Nd doped yttrium aluminum garnet, and titanium doped sapphire. In addition, examples of near-IR fluorescent pigments may include phosphors that emit in the deep red or near-IR (e.g., $LiAlO_2$:Fe, CaS:Yb).

The near-IR reflective coating system of the present invention may also include the incorporation of at least one near-IR fluorescent organic pigment and/or dye. As used herein, the term "near-IR fluorescent organic pigment and/or dye" refers to an organic pigment and/or dye which can absorb electromagnetic radiation in the visible region (400 to 700 nm) and fluoresce in the near-IR region (700 to 2500 nm). Examples of suitable near-IR fluorescent organic pigments and/or dyes include, spiro[indeno[1,2-b]chromene-10,1'-isobenzofuran]-3'-ones, 7-(dialkylamino)-3'H,11H-spiro[indeno[1,2-b]chromene-10,1'-isobenzofuran]-3'-ones, changsha (CS1-6) near-IR fluorophores, thienopyrazines, rhodamines, such as aminobenzofuran-fused rhodamine dyes (AFR dyes) containing amino groups, sulforhodamine dyes, perylenediimide or hexarylenediimides, donor-acceptor charge transfer compounds such as substituted thiophenes, diphenylbenzobisthiadiazoles, and selenium or tellurium substituted derivatives, cyclic polyenes, cyclic polyene-ynes, perylenes, perylenebis(dicarboximide)s such as perylene bis(phenethylimide, or perylene bis(2,5-di-tert-butylphenylimide), perylene diimides containing nitrogen donor groups, polymethines, borondipyrromethenes, pyrrolopyrrole cyanines, squaraine dyes, tetrathiafulvalene, thiadiazole fused chromophores, phthalocyanine and porphyrin derivatives, metalloporphyrins, BODIPY (borondipyrromethane) dyes, tricarbocyanines, rubrenes, carbon nanotubes, and graphene and graphene oxide.

The at least one near-IR fluorescent organic pigment and/or dye may be encapsulated as nanoparticles in polymers such as amphiphilic block copolymer. For example, an amphiphilic block copolymer encapsulating near-IR fluorescent organic pigment and/or dye nanoparticles may be poly(caprolactone)-b-poly-(ethylene glycol) (PCL-b-PEG). Furthermore, the at least one near-IR fluorescent organic pigment and/or dye may be covalently bonded to the polymer matrix of the encapsulating polymer. In addition, the near-IR fluorescent organic pigment and/or dye may be anchored to a polymeric or inorganic particle.

The weight ratio of near-IR reflective pigment to near-IR fluorescent pigment present in the composition from which the second coating layer may be deposited may be at least 1.5:1, such as at least 5:1, at least 10:1, or at least 20:1. In other examples, the weight ratio of near-IR reflective pigment to near-IR fluorescent pigment present in the composition can be at least 1:1.5, such as at least 1:5, or at least 1:10.

According to the present invention, the near-IR fluorescent pigments may fluoresce or emit electromagnetic radiation at a different wavelength than the reflected electromagnetic radiation from the near-IR reflective pigments. For example, a multi-layer coating system that incorporates both the near-IR fluorescent pigments and the near-IR reflective pigments may be capable of absorbing electromagnetic radiation in the visible region and fluoresce at a longer wavelength than the reflective near-IR pigments. For example, the near-IR fluorescent pigments may absorb electromagnetic radiation from 400 nm-700 nm and fluoresce at a wavelength greater than 1000 nm while the near-IR reflective pigments can reflect electromagnetic radiation having a wavelength of 905 nm. In this example, it may be possible to employ a near-IR sensor or a plurality of sensors to detect the different wavelengths. With this example in mind, one skilled in the art may develop a multi-layer coating system that has a unique near-IR signature (e.g., multiple near-IR signals).

In certain examples of the present invention, the second coating layer may be, like the first coating layer, substantially free, or, in some cases, completely free, of carbon black. If desired, the second coating layer may include other optional materials well known in the art of formulated surface coatings, such as any of those described earlier with respect to the first coating layer. In certain examples, the near-IR reflective coating may be substantially free of carbon black, including all layers thereof (e.g., the first coating layer, the second coating layer, and any other coating layer).

One advantage of the coating systems of the present invention is that proper use of visually opaque near-IR reflective pigments in the second coating layer, such as the thin flake metal, metal alloy or metal oxide near-IR reflective pigments described earlier, may enable the production of a coating layer that has the requisite hiding at relatively low dry film thicknesses, such as no more than 2 mils (50.8 microns), such as no more than 1 mil (25.4 microns), or no more than 0.5 mil (12.7 microns).

The coating compositions from which each of the coatings described above are deposited may be applied to a substrate by any of a variety of methods including dipping or immersion, spraying, intermittent spraying, dipping followed by spraying, spraying followed by dipping, brushing, or roll-coating, among other methods. In certain examples, the coating compositions may be applied by spraying and, accordingly, such compositions may have a viscosity that is suitable for application by spraying at ambient conditions.

After application of a coating composition to the substrate, it may be allowed to coalesce to form a substantially continuous film on the substrate. Typically, the dry film thickness will be 0.01 mil to 20 mils (0.25 microns to 508 microns), such as 0.01 mil to 5 mils (0.25 micron to 127 microns), or, in some cases, 0.1 mil to 2 mils (2.54 microns to 50.8 microns) in thickness. A method of forming a coating film according to the present invention, therefore, may include applying a coating composition to the surface of a substrate or article to be coated, coalescing the coating composition to form a substantially continuous film and then curing the thus-obtained coating. In certain examples, the curing of these coatings may include a flash at ambient or elevated temperatures followed by a thermal bake. In some cases, curing may occur at ambient temperature of 20° C. to 175° C., for example.

When comparing an object coated with the near-IR reflective coating of the present invention with an object coated with a color matched coating which absorbs more of the same near-IR radiation, the near-IR radiation detection distance can be increased by at least 15%. The color matched coating typically has a ΔE color matched value of 1.5 or less when compared to the near-IR reflective coating, as measured using an integrating sphere with D65 Illumination, 10° observer with specular component included. In some cases, the ΔE color matched value may be 1.0 or less or 0.8 or less. The radiation detection distance means the maximum distance between the radiation source and the object for which detection of the object is accomplished with the radiation detection system, such as a LIDAR system. According to the present invention the near-IR reflective coating is capable of increasing the near-IR electromagnetic radiation detection distance by at least 15%, such as at least 25%, or at least 35%.

The ΔE color match value between a near-IR coating and a conventional coating with the near-IR reflective pigments can be determined using L*, a*, and b* values, which define coordinates in color space. ΔE is the difference between two colors based on the difference between collected values of L*, a*, and b* according to Equation 1 (below).

$$\Delta E = \sqrt{(\Delta L^*)^2 + (\Delta a^*)^2 + (\Delta b^*)^2} \qquad \text{Equation 1}$$

Depending on the color and the reflective pigments incorporated in the coating, the near-IR reflective coating of the present invention may have near-IR reflectance properties such that the coating has a reflectance of at least 20% as measured at an electromagnetic wavelength in the near-IR range (e.g., 905 nm, 1550 nm, or any other wavelength in the near-IR range, such as 900 nm-1600 nm), such as at least 70%. For example, a near-IR reflective coating having a visible black color may have a reflectance of at least 70% when measured at an electromagnetic radiation in the near-IR range (e.g., 905 nm, 1550 nm, or any other in the near-IR range, such as 900 nm-1600 nm). In another example, the near-IR reflective coating having a visible blue color may have a reflectance of at least 20% when measured at an electromagnetic radiation in the near-IR range (e.g., 905 nm, 1550 nm, or any other wavelength in the near-IR range, such as 900 nm-1600 nm).

The present invention may include a system for detecting proximity of vehicles including a first vehicle at least partially coated with a near-IR reflective coating that increases a near-IR electromagnetic radiation detection distance by at least 15% as measured at a wavelength in a near-IR range between the first vehicle and a second vehicle as compared to the first vehicle coated with a color matched coating which absorbs more of the near-IR radiation. The color matched coating has a ΔE color matched value of 1.5 or less when compared to the near-IR reflective coating. The second vehicle may be an autonomously operated vehicle.

The present invention may include a system for detecting the proximity of a first vehicle to a second vehicle, including: (a) a first vehicle at least partially coated with a near-IR reflective coating that increases a near-IR electromagnetic radiation detection distance by at least 15% as measured at a wavelength in a near-IR range as compared to a vehicle coated with a similar color matched coating which absorbs more of the near-IR radiation, wherein the similar color matched coating has a ΔE color matched value of 1.5 or less when compared to the near-IR reflective coating; and (b) a second vehicle including: (i) a near-IR electromagnetic radiation source that directs near-IR electromagnetic radiation towards the first vehicle; (ii) a near-IR detector that detects near-IR electromagnetic radiation reflected from the first vehicle; and (iii) a computing device that determines the detection distance between the first vehicle and second vehicle based in part on the detected near-IR electromagnetic radiation reflected from the first vehicle. The second vehicle may be an autonomously operated vehicle.

Figure 2:
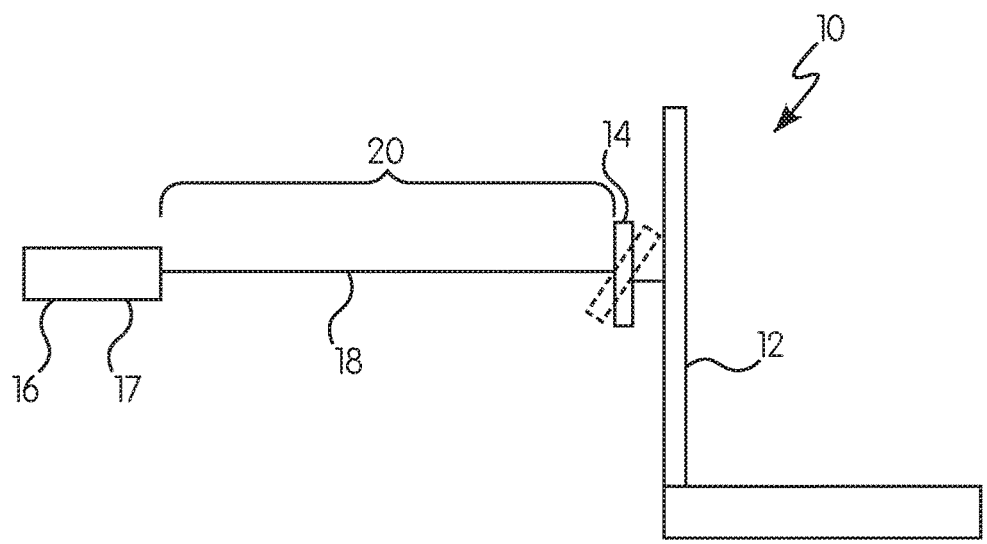
FIG. 2 is a schematic drawing illustrating the orientation positions of a near-IR reflective coated test panel in relation to a LIDAR device.

Referring to FIGS. 1 and 2, an exemplary test system 10 for determining detection distance is shown. This test system 10 includes a mount 12 to which a panel 14 is pivotably mounted. The panel 14 is coated with the near-IR reflective coating previously described herein. The test system 10 may also include a near-IR electromagnetic radiation source 16 that directs near-IR electromagnetic radiation 18 towards the coated panel 14. The coated panel 14 may be positioned at an angle normal to the radiation source 16 (90°) (see FIG. 1) or positioned at a 30° angle relative to the normal angle (see FIG. 2).

The test system 10 may also include a near-IR detector 17 that detects near-IR electromagnetic radiation that reflects off of the coated panel 14. As shown in FIG. 2, the radiation source 16 and the near-IR detector 17 may be integrated into the same device/housing unit or may be separate devices (not shown). As shown in FIG. 2, the radiation source 16 directs near-IR radiation 18 towards the coated panel 14. The distance between the radiation source 16 and the coated panel 14 may be a distance 20, which may be calculated by a computing device (not shown) based on part on the near-IR radiation 18 reflected off of the coated panel 14.

While the test system 10 shown in FIGS. 1 and 2 merely shows a simple panel 14 attached to a generic mount 12, it will be appreciated that the concepts of this test system 10 may translate to the previously-described system in which the mount 12 is a vehicle (or other previously described object) and the test panel 14 is the near-IR reflective coating on the surface of the vehicle (or other previously described object).

EXAMPLES

The following examples are presented to demonstrate the general principles of the invention. The invention should not be considered as limited to the specific examples presented.

Example 1

A cellulose acetate butyrate resin mixture was prepared using the ingredients and amounts listed in Table 1.

TABLE 1

Cellulose Acetate Butyrate Resin

| Component | Amount (kg) |
| --- | --- |
| Normal butyl alcohol | 16.8 |
| Xylene | 3.4 |
| N-butyl acetate (urethane grade) | 64.5 |
| Cellulose acetate butyrate - CAB 531-1[1] | 15.3 |
| Total formula weight | 100.0 |

[1]Commercially available from Eastman Chemical (Kingsport, TN)

Solvents were combined and stirred at a low speed using a cowles blade attached to an air motor. While stirring at a low speed (from 1000 RPM-1400 RPM), half of the total mass of cellulose acetate butyrate resin was added slowly. The mixture was then stirred at high speed for 10 minutes. After 10 minutes, the stir rate was adjusted back to a low (from 1000 RPM-1400 RPM) speed and the remaining cellulose acetate butyrate resin was added slowly. Once all the cellulose acetate butyrate was added, the mixture was stirred at high speed (approximately 1500 RPM) for 30 minutes or until the cellulose acetate butyrate was completely dissolved.

Example 2

An acrylic resin was synthesized using the ingredients and amounts listed in Table 2.

TABLE 2

Acrylic Resin

| Component | Amount (kg) |
| --- | --- |
| Glycidyl ester - CARDURA ® E-10P[2] | 10.6 |
| Methyl ether propylene glycol acetate | 11.7 |
| Xylene | 27.7 |
| Styrene monomer | 17.4 |
| Hydroxyethyl methacrylate | 12.5 |
| Methyl methacrylate (MeHQ inhibited) | 8.3 |
| Glacial acrylic acid (inhibited) | 3.5 |
| Tertiary dodecane thiol | 1.5 |
| Di-tertiary butyl peroxide | 1.7 |
| Aromatic hydrocarbon mixture- 100 type | 3.4 |
| N-butyl acetate (urethane grade) | 1.9 |
| Total formula weight | 100.0 |

[2]Commercially available from Hexion (Columbus, OH)

A reactor vessel was charged with 100% $N_2$ for 20 minutes to purge before setting to reflux. The $N_2$ was turned off after 10 minutes, the reactor was set to reflux, and 10% $N_2$ was applied. CARDURA® TM E-10P was added to the reactor along with 94% of the total mass of methyl ether propylene glycol acetate and 75% of the total mass of xylene. The mixture was heated to a reflux temperature of 290-295° F. (143-146° C.). Once the solution was refluxing, monomer and catalyst feeds were added to the reactor. A mixture of monomers including styrene monomer, hydroxyethyl methacrylate, methyl methacrylate, glacial acrylic acid, and tertiary dodecane thiol was added at a feed rate of 6.9 kg/min over the course of 2 hours. A mixture of di-tertiary butyl peroxide and 13% of the total mass of xylene was also added over the course of 2 hours at a feed rate of 9.6 kg/min. After 2 hours, when the monomer and catalyst feed were complete, solvent was added to the mixture. The first solvent rinse included 4% of the total mass of xylene. The second solvent rinse included 2% of the total mass of xylene. After the solvent rinses, the reactor was kept at reflux temperature for 4 hours. After 4 hours, the reactor was cooled. Once the reactor reached a temperature below 250° F. (121° C.), the contents of the reactor were removed to a thin tank. Solvents, including aromatic hydrocarbon mixture and N-butyl acetate, were added to the reactor and the rinsed contents were added to the thin tank. The resin mixture was cooled to 125° F. (52° C.) and the remaining xylene and methyl ether propylene glycol acetate were added to the mixture. The amounts added corresponded to 5% of the total mass of xylene and 6% of the total mass of methyl ether propylene glycol acetate. The fully formulated resin was filtered through a press and CELITE® 545, a filter aid, commercially available from Sigma-Aldrich (St. Louis, Mo.).

Example 3

Silica Dispersions 1 and 2 were synthesized using the ingredients and amounts listed in Tables 3 and 4, respectively.

TABLE 3

Silica Dispersion 1

| Component | Amount (kg) |
| --- | --- |
| Acrylic resin (Example 2) | 82.4 |
| N-butyl acetate (urethane grade) | 15.7 |
| Fumed silica - AEROSIL ® 200[3] | 1.9 |
| Total formula weight | 100.0 |

[3]Commercially available from Evonik Industries (Essen, Germany)

Silica Dispersion 1 was prepared by combining 30% of the total mass of acrylic resin in Example 2 with 39% of the total mass of N-butyl acetate and 100% of the total mass of AEROSIL® 200. The mixture was stirred at high (approximately 1500 RPM) speed using a cowles blade attached to an air motor for 20 minutes. The mixture was milled using a Premier mill containing 1.7 mm-2.4 mm Zirconox media which occupied 70% of the mill volume. The mixture was milled until a 7.0 rating was achieved using a Hegman gauge. The mixture was then collected from the mill in a washout step which added 3% of the total mass of acrylic resin (Example 2) and 22% of the total mass of N-butyl acetate. The collected mixture was stirred at a low (from 1000 RPM-1400 RPM) speed using a cowles blade attached to an air motor. While stirring at low (from 1000 RPM-1400 RPM) speed, the remaining mass of acrylic resin (Example 2) and N-butyl acetate were added slowly. The amounts added correspond to 67% of the total mass of acrylic resin (Example 2) and 39% of the total mass of N-butyl acetate. The fully formulated Silica Dispersion 1 was stirred at high (approximately 1500 RPM) speed using a cowles blade for 20 minutes.

TABLE 4

Silica Dispersion 2

| Component | Amount (kg) |
| --- | --- |
| N-butyl acetate (urethane grade) | 71.2 |
| Xylene | 2.4 |
| Normal butyl alcohol | 11.8 |
| Cellulose acetate butyrate - CAB 531-1[4] | 10.7 |
| Fumed silica - AEROSIL ® 200[5] | 1.9 |
| Total formula weight | 100.0 |

[4]Commercially available from Eastman Chemical (Kingsport, TN)
[5]Commercially available from Evonik Industries (Essen, Germany)

Silica Dispersion 2 was prepared by combining 94% of the total mass of N-butyl acetate shown in Table 4 with 100% of the total mass of xylene and 100% of the total mass of normal butyl alcohol. The mixture was stirred at low (from 1000 RPM-1400 RPM) speed using a cowles blade attached to an air motor. While stirring at low (from 1000 RPM-1400 RPM) speed, the cellulose acetate butyrate was added slowly. Once all the cellulose acetate butyrate was added, the mixture was stirred at a high (approximately 1500 RPM) speed for 30 minutes or until the cellulose acetate butyrate was complete dissolved. The AEROSIL® 200 was added, the mixture was stirred at high speed for 20 minutes. The mixture was milled using a Premier mill containing 1.7 mm-2.4 mm Zirconox media (commercially available from Jyoti Ceramic Industries PVT. LTD. (Maharashtra, India)) which occupied 70% of the mill volume. The mixture was milled at approximately 2000 FPM until a 6.0 rating was achieved using a Hegman gauge. The mixture was then collected from the mill in a washout step with added 6% of the total mass of N-butyl acetate. The collected mixture was stirred at high (approximately 1500 RPM) speed using a cowles blade attached to an air motor for 1 hour.

Example 4

Near-IR transparent black tint pastes were prepared using the ingredients and amounts listed in Tables 5.

TABLE 5

Near-IR Transparent Black Tint Pastes

| Component | Paste TB1 (kg) | Paste TB2 (kg) |
|---|---|---|
| Cellulose acetate butyrate resin mixture - (Example 1) | 39.6 | 39.6 |
| Acrylic resin - (Example 2) | 12.2 | 12.2 |
| Silica Dispersion 1 - (Example 3) | 8.5 | 8.5 |
| Methyl ether propylene glycol | 6.3 | 6.3 |
| N-butyl acetate (urethane grade) | 7.8 | 7.8 |
| Aromatic hydrocarbon mixture - 100 type | 2.5 | 2.5 |
| Wetting and dispersing additive - DISPERBYK ®-161[6] | 2.3 | 2.3 |
| Black pigment - PALIOGEN ® Black L0086[7] | 13.8 | 0 |
| Black pigment - PALIOGEN ® Black EH-0788[8] | 0 | 13.8 |
| Silica Dispersion 2 - (Example 3) | 5.6 | 5.6 |
| Ethoxy propyl acetate | 1.2 | 1.2 |
| Polyether modified polysiloxane - BORCHI ® Gol OL 17[9] | 0.1 | 0.1 |
| Benzotriazole UV absorber - EVERSORB ® 74[10] | 0.1 | 0.1 |
| Total formula weight | 100.0 | 100.0 |

[6]Commercially available from BYK Additives and Instruments (Wesel, Germany)
[7]Commercially available from BASF Corporation (Ludwigshafen, Germany)
[8]Commercially available from BASF Corporation (Ludwigshafen, Germany)
[9]Commercially available from Borchers (Westlake, OH)
[10]Commercially available from Everlight Chemical Industrial Corp. (Taiwan)

Tint pastes TB1 and TB2 were each prepared by combining the components, in the order shown in Table 5. DISPERBYK®-161 and pigments PALIOGEN® Black L0086 and PALIOGEN® Black EH-0788 were added to the respective tint paste mixtures while stirring at low speed (from 1000 RPM-1400 RPM) using a cowles blade attached to an air motor. Following the addition of pigment, the tint paste mixtures were stirred at high (approximately 1500 RPM) speed using a cowles blade for 20 minutes. Both tint paste mixtures were milled using a Premier mill containing 1.2 mm-1.7 mm Zirconox media (commercially available from Jyoti Ceramic Industries PVT. LTD. (Maharashtra, India)) which occupied 75% of the mill volume. Both tint paste mixtures were milled at a speed from 2300-2600 FPM until a 6.5 rating was achieved using a Hegman gauge. The tint paste mixtures were then collected from the mill in a washout step with ethoxy propyl acetate and Silica Dispersion 2 (Example 3). Additional components, including BORCHI® Gol OL 17, a polyether modified polysiloxane, and EVERSORB® 74, the benzotriazole UV absorber, were added and the fully formulated tint paste mixtures were stirred at high speed (approximately 1500 RPM) using a cowles blade for 20 minutes.

Example 5

Conventional and near-IR reflective coating stacks were prepared using the components listed in Tables 6 and 7.

TABLE 6

Coating Stacks

| Component | Conventional Coating Stack | Near-IR Reflective Coating Stack |
|---|---|---|
| Substrate | ACT CRS C700 C59 ED6465[11] | ACT CRS C700 C59 ED6465[11] |
| Sealer | DELTRON ® V-SEAL ™ DASG61[12] | DELTRON ® V-SEAL ™ DAS 3021[13] |
| White topcoat | none | DELTRON ® DMD 1684[13] |
| Colored topcoat | DMD 16xx (multiple; colored)[14] DMD 1683 (black)[15] | DMD 16xx (multiple; colored)[14] TB1 and TB2 from Example 4 (black) |
| Clearcoat | DELTRON ® DC 4000[15] | DELTRON ® DC 4000[15] |

[11]Commercially available from ACT (Hillsdale, MI); Cold rolled steel (CRS) was prepared by ACT using PPG Industries, Inc. (Pittsburgh, PA) products and procedures as follows-alkaline cleaner (ChemKleen 2010LP), Versabond pretreatment (C700) with Chemseal 59 rinse (C59) and Electrocoat (ED6465).
[12]Acrylic urethane sealer commercially available from PPG Industries, Inc. (Pittsburgh, PA)
[13]Acrylic urethane sealer commercially available from PPG Industries, Inc. (Pittsburgh, PA)
[14]Acrylic tint paste commercially available from PPG Industries, Inc. (Pittsburgh, PA)
[15]Acrylic urethane clearcoat commercially available from PPG Industries, Inc. (Pittsburgh, PA)

TABLE 7

Tint Pastes and Resins Used to Make Colored Topcoats

| | | Colored Topcoat Use | |
|---|---|---|---|
| Component | Description | Conventional | Near-IR reflective |
| DMD 1683[16] | Basecoat black | R1, DR1, BK1, BL1, DBL1 | None |
| DMD 1677[16] | Scarlet red | R1, DR1 | R2, DR2 |
| DMD 1611[16] | Bright Orange | R1, DR1 | R2, DR2 |
| DMD 1608[16] | Organic orange | R1, DR1 | R2, DR2 |
| DMD 1627[16] | Indo blue | BL1, DBL1 | BL2, DBL2 |
| DMD 1621[16] | Fine titanium white | BL1 | BL2 |
| TB1 (Example 4) | Near-IR transparent black | None | R2, DR2, BK2, BL2, DBL2 |
| TB2 (Example 4) | Near-IR transparent black | None | R2, DR2, BK2, BL2, DBL2 |
| DBC 500[17] | Color blender resin | None | BK2 |

[16]Acrylic tint paste commercially available from PPG Industries, Inc. (Pittsburgh, PA)
[17]Acrylic coating commercially available from PPG Industries, Inc. (Pittsburgh, PA)

Acrylic urethane sealer coatings were applied directly to substrates in conventional and near-IR reflective coatings stacks. Conventional systems used a gray PPG DELTRON® V-SEAL™ DAS G6 sealer and near-IR reflective systems used a white PPG DELTRON® V-SEAL™ DAS 3021 sealer. Sealers were prepared for spray application by mixing DAS 3021 or DAS G6 gray, prepared by combining DAS 3025 and DAS 3027 (to achieve DAS G6 gray) with DCX 3030 (commercially available from PPG Industries, Inc. (Pittsburgh, Pa.)) and DT 870 reducer (commercially available from PPG Industries, Inc. (Pittsburgh, Pa.)) in a 3:1:1 v/v ratio. For DAS G6 sealer, this ratio was 2:1:1:1 v/v (DAS 3025:DAS 3027:DCX 3030:DT 870). Corresponding masses of each component are recorded in Table 8 below. Each mixture was agitated prior to spray application by stirring. Sealers were sprayed over substrates using a high volume low pressure (HVLP) gravity fed spray gun (SATA jet 4000) with a 12" fan spray and 27 psi at the gun nozzle (1.4 mm opening). DAS G6 and DAS 3021 sealers were each applied on their respective substrate as one coat. For the near-IR reflective coating stack, white topcoat (DMD 1684) was applied immediately over DAS 3021. Coatings were cured at ambient temperature (20° C.) for 15 min. Topcoats were applied after cure or within 72 hours.

TABLE 8

Sealers as Prepared for Spray Application

| Component | Description | DAS G6 (g) | DAS 3021 (g) |
|---|---|---|---|
| DAS 3025 | Gray sealer | 236.8 | 0.0 |
| DAS 3027 | Dark gray sealer | 121.7 | 0.0 |
| DAS 3021 | White sealer | 0.0 | 359.0 |
| DCX 3030 | Isocyanate hardener | 75.7 | 75.4 |
| DT 870 | Reducer | 65.8 | 65.6 |
| | Total formula weight | 500.0 | 500.0 |

Example 6

A white colored topcoat was prepared and applied as follows:

A white colored topcoat (PPG DELTRON® DMD 1684) was applied directly over DAS 3021 sealer used in near-IR reflective coating stacks. The white topcoat was applied immediately after application of DAS 3021 sealer. The white topcoat included a bright white tint paste containing titanium dioxide (DMD 1684) that was diluted with DT 870 reducer in a 1:1 v/v ratio. Corresponding masses of each component are shown in Table 9. The mixture was agitated prior to spray application by stirring. Two coats were applied over DAS 3021 using an HVLP gravity fed spray gun (SATA jet 4000) with a 12" fan spray and 27 psi at the gun nozzle (1.4 mm opening) with a 10 min period at ambient temperature between coats. Coatings were cured at ambient temperature (20° C.) for 20 min before application of any additional coatings.

TABLE 9

White Topcoats as Prepared for Spray Application

| Component | Description | DMD 1684 (g) |
|---|---|---|
| DMD 1684 | White tint paste | 121.47 |
| DT 870 | Reducer | 78.53 |
| | Total formula weight | 200.0 |

Example 7

Colored topcoats were prepared and applied as follows:

Colored topcoats for conventional and near-IR reflective coating stacks were formulated with multiple PPG DELTRON® solvent borne tint pastes (DMD 16xx) to achieve shades of red (R), dark red (DR), black (BK), blue (BL), or dark blue (DBL). For near-IR coating stacks, carbon black tint paste (DMD 1683) was completely removed and substituted with a blend of near-IR transparent perylene black tint pastes prepared in Example 4 (TB1 and TB2). Mixtures of colored tint pastes used for conventional topcoats (R1, DR1, BK1, BL1, and DBL1) and those used for near-IR topcoats (R2, DR2, BK2, BL2, and DBL2) were diluted with DT 870 reducer in a 1:1 v/v ratio. Corresponding masses of each component are recorded in Table 10. The mixtures were agitated prior to spray application by stirring. An HVLP gravity fed spray gun (SATA jet 4000) with a 12" fan spray and 27 psi at the gun nozzle (1.4 mm opening) was used to spray apply the coatings. Conventional topcoats containing carbon black (R1, DR1, BK1, BL1, and DBL1) were applied over DAS G6 sealer. Coatings containing near-IR transparent black tint pastes (R2, DR2, BK2, BL2, and DBL2) were applied over DAS 3021/DMD 1684 sealer/white topcoat. Colored topcoats were allowed to flash between multiple coats for 5-10 minutes and were considered dry when the coatings were tack free (15-20 minutes at 20° C.).

TABLE 10

Colored Topcoats as Prepared for Spray Application

| Component | Description | R1 (g) | R2 (g) | DR1 (g) | DR2 (g) | BK1 (g) | BK2 (g) | BL1 (g) | BL2 (g) | DBL1 (g) | DBL2 (g) |
|---|---|---|---|---|---|---|---|---|---|---|---|
| DMD 1683 | Basecoat black | 6.0 | 0.0 | 20.8 | 0.0 | 105.2 | 0.0 | 4.7 | 0.0 | 10.0 | 0.0 |
| DMD 1677 | Scarlet red | 80.9 | 83.9 | 61.4 | 70.5 | 0.0 | 0.0 | 0.0 | 0.0 | 0.0 | 0.0 |
| DMD 1611 | Bright orange | 4.1 | 4.2 | 12.8 | 13.9 | 0.0 | 0.0 | 0.0 | 0.0 | 0.0 | 0.0 |
| DMD 1608 | Organic orange | 16.2 | 16.8 | 12.3 | 14.1 | 0.0 | 0.0 | 0.0 | 0.0 | 0.0 | 0.0 |
| DMD 1627 | Indo blue | 0.0 | 0.0 | 0.0 | 0.0 | 0.0 | 0.0 | 62.6 | 67.8 | 132.5 | 137.0 |
| DMD 1621 | Fine titanium white | 0.0 | 0.0 | 0.0 | 0.0 | 0.0 | 0.0 | 3.5 | 3.6 | 0.0 | 0.0 |
| TB1 (Example 4) | Near-IR transparent black | 0.0 | 2.4 | 0.0 | 7.8 | 0.0 | 20.7 | 0.0 | 1.6 | 0.0 | 3.1 |
| TB2 (Example 4) | Near-IR transparent black | 0.0 | 0.4 | 0.0 | 1.4 | 0.0 | 3.7 | 0.0 | 0.3 | 0.0 | 0.6 |
| DBC 500 | Color blender | 0.0 | 0.0 | 0.0 | 0.0 | 0.0 | 81.6 | 0.0 | 0.0 | 0.0 | 0.0 |
| DT 870 | Reducer | 92.8 | 92.2 | 92.7 | 92.4 | 94.8 | 94.0 | 129.2 | 126.7 | 57.5 | 59.4 |
| | Total formula weight | 200.0 | 200.0 | 200.0 | 200.0 | 200.0 | 200.0 | 200.0 | 200.0 | 200.0 | 200.0 |

Example 8

A clearcoat was prepared and applied as follows:

PPG DELTRON® solvent borne clearcoat (Velocity Premium Clearcoat; DC 4000) was prepared by mixing DC 4000 with hardener (DCH 3085) in a 4:1 v/v ratio. Corresponding masses of each component are shown in Table 11. The mixtures were agitated prior to spray application by stirring. Clearcoats were applied in two coats over tack-free top coats using an HVLP gravity fed spray gun (SATA jet 4000) with a 12" fan spray and 27 psi at the gun nozzle (1.4 mm opening). Clearcoats were applied using two coats with a 5-7 minute flash at ambient temperature (20° C.) between coats for 5-10 minutes. Clearcoats were cured in a convection oven at 60° C. for 20 minutes.

TABLE 11

Clearcoat as Prepared for Spray Application

| Component | Description | DMD 1684 (g) |
|---|---|---|
| DC 4000 | Velocity premium clearcoat | 391.1 |
| DCH 3085 | Mid temperature hardener | 109.0 |
| | Total formula weight | 500.1 |

Example 9

Coatings were measured for opacity as follows:

Coatings described in Examples 6-8 were drawn down over black and white opacity charts (BYK Leneta) using stainless steel rods wrapped with wire of varied diameter (from RD Specialties, Inc. (Webster, N.Y.)). This determined the dry film thickness necessary for each coating to eliminate the transmission of light in the visual spectrum (400 nm-700 nm) to the underlying coating or substrate.

To measure opacity, an integrating sphere spectrophotometer (X-rite Color i7) was used to diffusely illuminate the samples and measure total light reflected (L*). L* represents the lightness of the sample where L*=0 is black and L*=100 is diffuse white. Opacity was calculated by taking the ratio of two L* measurements for each coating, one over the black side of the chart and one over the white side of the chart (Equation 2). A coating was determined to be opaque when a value of 100 was achieved. Dry film thicknesses for coatings described in Examples 6-8 used to achieve opacity are reported in Table 12.

$$\text{Opacity} = \left(\frac{L^* \text{ sample over white}}{L^* \text{ sample over black}}\right) \times 100 \qquad \text{Equation 2}$$

For near-IR reflective coating stacks, DAS 3021 sealer achieved opacity by using a combination of one coat of DAS 3021 and two coats of white topcoat (DMD 1684).

TABLE 12

Dry Film Thickness Values to Achieve Coating Opacity

| Coating(s) | Number of coats | Dry film thickness (μm) |
|---|---|---|
| DAS G6 | 1 | 20 |
| DAS 3021, DMD 1684 | 1, 2 | 37, 20 |

TABLE 12-continued

Dry Film Thickness Values to Achieve Coating Opacity

| Coating(s) | Number of coats | Dry film thickness (μm) |
|---|---|---|
| R1 | 3 | 20 |
| R2 | 3 | 18 |
| DR1 | 2 | 13 |
| DR2 | 2 | 11 |
| BK1 | 3 | 11 |
| BK2 | 3 | 18 |
| BL1 | 2 | 14 |
| BL2 | 2 | 14 |
| DBL1 | 3 | 18 |
| DBL2 | 3 | 19 |

Example 10

Coatings were color matched by the follow methods:

Conventional and near-IR reflective coating stacks were evaluated in color space to determine a visual color match. Complete coating stacks (C-) were defined by color (R, DR, BK, BL, and DBL). An integrating sphere spectrophotometer (X-rite Color i7) was used to evaluate conventional and near-IR systems where each layer within the system was applied to achieve opacity (Example 9). A color match between conventional and near-IR reflective systems was determined using L*, a*, and b* values, which define coordinates in color space. Delta E (ΔE) was used to calculate the difference between two colors based on the difference between collected values of L*, a*, and b* according to Equation 3. Here, a difference of approximately ≤1.5 was accepted as a good color match. Values of ΔE were reported for full coating stacks (Table 13).

$$\Delta E = \sqrt{(\Delta L^*)^2 + (\Delta a^*)^2 + (\Delta b^*)^2} \qquad \text{Equation 3}$$

TABLE 13

ΔE Values for Coating Stacks

| Coating stack color | ΔE |
|---|---|
| C-R | 0.8 |
| C-DR | 1.0 |
| C-BK | 1.2 |
| C-BL | 0.4 |
| C-DBL | 0.8 |

Example 11

Coatings were characterized by the follow methods:

Conventional and near-IR reflective coating stacks described in Example 5, prepared according to Examples 6-9 and characterized according to Examples 10 and 11 were used for total solar reflectance measurements. A UV-Vis-NIR Lambda 950 spectrophotometer was used to measure the percent reflection of samples across near-IR wavelengths (700 nm-2500 nm) and also specifically at 905 nm, which is the wavelength used by certain LIDAR detectors (Table 14).

TABLE 14

Reflectance Measurements at Near-IR Wavelengths

| | Percent Reflectance | |
|---|---|---|
| Coating color | Total Near-IR (700-2500 nm) | 905 nm |
| C-R1 | 8.0 | 15.2 |
| C-R2 | 36.4 | 79.4 |
| C-DR1 | 3.8 | 6.9 |
| C-DR2 | 35.4 | 80.1 |
| C-BK1 | 2.0 | 3.7 |
| C-BK2 | 32.3 | 77.0 |
| C-BL1 | 3.9 | 8.5 |
| C-BL2 | 19.6 | 30.2 |
| C-DBL1 | 3.6 | 7.6 |
| C-DBL2 | 20.7 | 24.1 |

Conventional and near-IR reflective coating stacks described in Example 5, prepared according to Examples 6-9 and characterized according to Examples 10 and 11 were used for LIDAR testing. Complete coating stacks (C-) were referred to by color (R, DR, BK, BL, and DBL) and whether they were a conventional or near-IR reflective system (1 or 2, respectively; Table 15). Three different LIDAR units were used to measure the outdoor maximum detection range of the coated 4"×12" panels. These included Velodyne VLP-16, Velodyne HDL32e, and Velodyne HDL64-S2 which used Veloview 3.1.1 software to record collected data points (Table 15).

TABLE 15

LIDAR Unit Properties

| Property | Velodyne VLP-16 | Velodyne HDL 23e | Velodyne HDL64-S2 |
|---|---|---|---|
| Laser wavelength (nm) | 905 | 903 | 905 |
| Measurement accuracy (mm) | +/−30 mm | +/−20 mm | +/−20 mm |
| Maximum range | 100 | 70 | 120 |

Panels were mounted on a stand where the 12" side was oriented parallel to the ground (see FIG. 1). Each panel was measured outdoors at two different angles of incidence relative to the LIDAR source. Panels were positioned at an angle that was normal to the LIDAR unit (90°) or positioned at a 30° angle relative to the normal angle (see FIG. 2). During each measurement, the mounted panel was positioned within line of sight of the LIDAR unit and was moved incrementally further from the unit until the return intensity of the signal from the panel was no longer detected using the Veloview 3.1.1 software. The average ambient illumination outdoors during testing was in the range of 60 lux-80,000 lux.

The maximum detection range for each LIDAR unit at each angle of illumination is reported in Table 16. The largest increase in detection range was achieved by red, dark red, and black colored near-IR reflective coating stacks (C-R2, C-DR2, and C-BK2). These coating stacks increased detection range up to a maximum of 56% depending on the LIDAR unit and angle of incidence. Blue and dark blue near-IR reflective coating stacks (C-BL2 and C-DBL2) also increased detection range, and these coating stacks increased detection range up to a maximum of 36%. The average percent improvement in detection range that was achieved using near-IR reflective coating stacks is reported in Table 17.

TABLE 16

Maximum Detection Range (m) of Coating Stacks Measured by LIDAR Units at Two Angles of Incidence

| Coating | Velodyne VLP-16 | | Velodyne HDL32e | | Velodyne HDL64-S2 | |
|---|---|---|---|---|---|---|
| Color | 0° | 30° | 0° | 30° | 0° | 30° |
| C-R1 | 60.2 | 53.4 | 70.1 | 67.1 | 85.3 | 82.3 |
| C-R2 | 83.8 | 65.2 | 109.1 | 83.6 | 119.1 | 104.9 |
| C-DR1 | 60.5 | 55.6 | 70.7 | 66.6 | 84.9 | 83.9 |
| C-DR2 | 76.5 | 72.5 | 89.2 | 82.7 | 95.8 | 109.1 |
| C-BK1 | 61.7 | 58.1 | 67.1 | 64.5 | 85.6 | 79.7 |
| C-BK2 | 81.1 | 74.0 | 97.6 | 84.4 | 119.1 | 101.6 |
| C-BL1 | 73.0 | 54.2 | 78.0 | 59.9 | 84.5 | 78.0 |
| C-BL2 | 72.9 | 63.4 | 80.8 | 70.4 | 88.2 | 91.5 |
| C-DBL1 | 60.6 | 53.7 | 68.3 | 68.6 | 82.6 | 79.5 |
| C-DBL2 | 71.1 | 70.2 | 78.0 | 70.5 | 87.8 | 90.0 |

TABLE 17

Average Percent Improvement in Detection Distance Achieved by Near-IR Reflective Coating Stacks at 905 nm Wavelength

| Coating stack color | Average % Improvement |
|---|---|
| C-R2 | 35% |
| C-DR2 | 25% |
| C-BK2 | 34% |
| C-BL2 | 15% |
| C-DBL2 | 22% |

Example 12

Conventional and improved near-IR reflective coating stacks, which reduce transmission of light through the coating stack and demonstrate a more jet black color, were designed and prepared as follows:

Coatings used in conventional systems contained carbon black pigment. Gray colored primers were shaded with $TiO_2$ and carbon black tint pastes. A mid-gray colored conventional primer formula (Primer MG1) were prepared as described in Example 5 of U.S. Pat. No. 7,959,981 with modification in levels of carbon black tint that were adjusted to achieve a mid-gray color (Table 18). Black colored conventional and near-IR transparent basecoat formulas (BK1 and BK2, respectively) were prepared according to Example 7.

Near-IR reflective coating stacks contained no carbon black in any of the coating layers. Mid-gray and white colored near-IR reflective primers (Primer MG2 and Primer W1, respectively) were prepared (Table 18). Mid-gray colored primers were shaded with $TiO_2$ and near-IR transparent black tint pastes prepared in Example 4. Near-IR reflective mid-gray primers were prepared as described in Example 5 of U.S. Pat. No. 7,959,981 without adding carbon black tint and instead adding near-IR transparent black tint pastes prepared in Example 4 to achieve a color that was a match to the conventional mid-gray primer. White primers were also prepared (as described in Example 5 of U.S. Pat. No. 7,959,981 with a modification that eliminated use of carbon black tint paste). Compared to a white primer containing only $TiO_2$, the near-IR reflective gray primers maintain high near-IR reflection and also improve protection of underlying coating layers from transmission of damaging wavelengths of light (400 nm-450 nm). Aesthetics of the near-IR reflective coating stack are also improved because a gray primer has less visual contrast with a dark colored topcoat if the topcoat is chipped or damaged to reveal the primer layer underneath.

Black colored topcoats used in near-IR reflective coating stacks (BK2) contained near-IR transparent colored tint pastes from Example 4 (Paste TB1 and Paste TB2) instead of carbon black tint paste. Black colored topcoats used in conventional coating stacks (BK1) contained carbon black tint paste. Basecoat mixtures were prepared as described in Example 7.

TABLE 18

Primer Formulas (Reference Example 5 of U.S. Pat. No. 7,959,981 B2)

| Component | Primer MG1 (g) | Primer MG2 (g) | Primer W1 (g) |
|---|---|---|---|
| Isopropyl acetate | 121.7 | 120.8 | 122.6 |
| RESIMENE ® R-718[18] | 104.6 | 103.8 | 105.3 |
| Polyester Polyol[19] | 146.9 | 145.8 | 147.9 |
| White Pigment Dispersion[20] | 122.9 | 121.9 | 123.7 |
| Flow Additive[21] | 0.5 | 0.5 | 0.5 |
| Black Pigment Dispersion[22] | 3.4 | 0.0 | 0.0 |
| TB1 (Example 4) | 0.0 | 5.7 | 0.0 |
| TB2 (Example 4) | 0.0 | 1.1 | 0.0 |
| Yellow Pigment Dispersion[23] | 0.0 | 0.5 | 0.0 |
| Total formula weight | 500.0 | 1000.0 | 500.0 |

[18]Used according to Example 5 of U.S. Pat. No. 7,959,981 B2; Melamine-formaldehyde resin solution commercially available from INEOS Melamines (Rolle, Switzerland)
[19]Prepared according to Example 5 of U.S. Pat. No. 7,959,981 B2; A polyester resin comprising 18% neopentyl glycol, 16% neopentyl glycol hydroxyl pivalate, 8% trimethol propane, 8% adipic acid, 16% e-caprolactone, and 34% isophthalic acid in n-butyl acetate solvent at 69% solids and approximately 4,800 Mw
[20]Used according to Example 5 of U.S. Pat. No. 7,959,981 B2; titanium dioxide pigment dispersion in polyester polyol resin, PPG Industries, Inc. (Pittsburgh, PA)
[21]Used according to Example 5 of U.S. Pat. No. 7,959,981 B2; Poly butyl acrylate flow additive commercially available from DuPont (Wilmington, DE)
[22]Used according to Example 5 of U.S. Pat. No. 7,959,981 B2; carbon black pigment dispersion in polyester polyol resin, PPG Industries, Inc. (Pittsburgh, PA)
[23]Yellow iron oxide pigment dispersion in polyester polyol resin, PPG Industries, Inc. (Pittsburgh, PA)

In both conventional and near-IR reflective coating stacks, clearcoat (TMAC9000FR, commercially available from PPG Industries, Inc. (Pittsburgh, Pa.)) was used directly for application over the colored topcoats.

Example 13

Conventional and improved near-IR reflective coating formulas prepared in Example 12 were spray-applied as coating stacks and cured according to U.S. Pat. No. 7,959,981.

Conventional coating stacks included mid-gray primer (Primer MG1), black basecoat (BK1), and clearcoat (TMAC 9000FR).

Near-IR coating stacks included near-IR reflective mid-gray primer (Primer MG2), near-IR transparent black basecoat (BK2), and clearcoat (TMAC 9000FR). In a second example, near-IR coating stacks included near-IR reflective white primer (Primer W1), near-IR transparent black basecoat (BK2), and clearcoat (TMAC 9000FR).

All coating stacks for reflectance measurements were applied to cold rolled steel (CRS) panels pretreated with zinc phosphate (C700), Chemseal 59 rinse (C59), and ED6465 gray cationic electrocoat were supplied by ACT (Hillsdale, Mich.).

All coatings stacks for transmission measurements required preparation as free films. This was accomplished by first applying TEDLAR® film (commercially available from DuPont (Wilmington, Del.)) to a cold rolled steel (CRS) panel supplied by ACT (Hillsdale, Mich.). The TEDLAR® films were smoothed and taped on the panel, then baked in a convection oven for 30 minutes at 140° C. Coatings stacks could then be applied and cured as specified and be completely released from the TEDLAR® film.

Example 14

Primer and basecoat formulas prepared in Example 13 were measured for opacity according to Example 9.

Dry film thicknesses for coatings described in Example 12 used to achieve opacity are reported in Table 19.

TABLE 19

Dry Film Thickness Values to Achieve Coating Opacity

| Coating | Number of coats | Dry film thickness (μm) |
|---|---|---|
| Primer MG1 | 1 | 23 |
| Primer MG2 | 1 | 25 |
| Primer W1 | 1 | 24 |
| BK1 | 1 | 12 |
| BK2 | 1 | 8 |

Example 15

Coatings were color matched according to Example 10.

Mid-gray conventional and near-IR reflective primers prepared in Example 12 (Primer MG1 and Primer MG2, respectively) were evaluated in color space to determine a visual color match. Conventional and near-IR transparent black basecoats prepared in Example 12 (BK1 and BK2, respectively) were evaluated in color space to determine a visual color match. In each case, basecoats were measured after clearcoat application, as designated by "C-BK1" for clearcoated conventional basecoat and "C-BK2" for clearcoated near-IR basecoat. Delta E values between coating stacks are represented as "Primer MG1" and "Primer MG2", as well as "C-BK1" and "C-BK2" in Table 20.

TABLE 20

ΔE Values for Coating Stacks

| Coatings Compared | ΔE |
|---|---|
| Primer MG1 to Primer MG2 | 0.9 |
| C-BK1 to C-BK2 | 1.1 |

Example 16

The transmission of coating stacks prepared as free films in Example 13 were characterized:

Percent light transmission was measured using a Perkin Elmer Lambda 950UV-vis spectrometer from 200 nm to 2500 nm. The total percent of transmitted light between 400 nm and 450 nm for each coating stack is reported in Table 21. Conventional and near-IR reflective coating stacks (primer, basecoat, clearcoat) are represented as "Primer MG1-BK1", "Primer MG2-BK2", and "Primer W1-BK2".

TABLE 21

Transmission Measurements of Full Coating Stacks

| Coating Stack | Description | Total Percent Transmission (400-450 nm) |
| --- | --- | --- |
| Primer MG1-BK1 | Conventional with mid-gray primer | 0.04 |
| Primer MG2-BK2 | Near-IR with mid-gray primer | 0.37 |
| Primer W1-BK2 | Near-IR with white primer | 7.95 |

Example 17

The near-IR reflection of coating stacks were characterized according to Example 11.

Conventional and near-IR reflective coating stacks described in Example 12, prepared according to Example 13, and characterized according to Examples 15 and 16 were used for total solar reflectance measurements. A UV-Vis-NIR Lambda 950 spectrophotometer was used to measure the percent reflection of samples across near-IR wavelengths (700 nm-2500 nm) and also specifically at 905 nm, which is the wavelength used by certain LIDAR detectors. Conventional and near-IR reflective coating stacks (primer, basecoat, clearcoat) are represented as "Primer MG1-BK1", "Primer MG2-BK2", and "Primer W1-BK2", and described in Table 22.

TABLE 22

Reflectance Measurements of Full Coating Stacks at Near-IR Wavelengths

| | | Percent Reflectance | |
| --- | --- | --- | --- |
| Coating Stack | Description | Total Near-IR (700-2500 nm) | 905 nm |
| Primer MG1-BK1 | Conventional with mid-gray primer | 3.5 | 3.6 |
| Primer MG2-BK2 | Near-IR with mid-gray primer | 50.2 | 68.7 |
| Primer W1-BK2 | Near-IR with white primer | 44.6 | 62.1 |

Example 18

A white primer was prepared using the ingredients and amounts listed in Table 23.

TABLE 23

White Primer

| Component | WP (kg) |
| --- | --- |
| EPON 1001-T-75[24] | 18.6 |
| Anti-Terra-U[25] | 0.5 |
| SILQUEST ® A-187[26] | 0.6 |
| TIOXIDE ® TR92[27] | 50.3 |
| n-Butyl alcohol | 3.6 |
| Aromatic hydrocarbon mixture - 100 type | 23.9 |
| 2-Butoxyethyl acetate | 2.5 |
| ARADUR ® 115x70[28] | 7.3 |
| Total formula weight | 107.3 |

[24]Commercially available from Hexion (Columbus, OH)
[25]Commercially available from BYK Additives and Instruments (Wesel, Germany)
[26]Commercially available from Momentive Performance Materials (Waterford, NY)
[27]Commercially available from Huntsman Corporation (The Woodlands, TX)
[28]Commercially available from Huntsman Corporation (The Woodlands, TX)

All materials except for the ARADUR® 115x70 were weighed into a glass jar. Liquid components, such as resin, liquid additives, and solvent were added first and hand-mixed before the addition of solid pigments. Zirconox media (1.2 mm-1.7 mm) was then added to the jar at a 1:1 mass ratio. The jar was sealed with a lid and tape and then placed on a Lau Disperser DAS 200 with a dispersion time of 2 hours. The final dispersion had a Hegman gauge value around 7. Aradur® 115x70 polyamidoamine hardener was then added and mixed in by hand. Acetone was added as a thinner to reach a spray viscosity of 30-60 cP on the Brookfield viscometer. The primer was then ready to spray.

Example 19

Near-IR transparent tint pastes were prepared using the ingredients and amounts listed in Table 24.

TABLE 24

Near-IR Transparant Tint Pastes

| Component | TP1 (B31) (kg) | TP2 (B32-P) (kg) | TP3 (B32-H) (kg) |
| --- | --- | --- | --- |
| Acrylic Dispersant[29] | 35.6 | 35.2 | 38.3 |
| n-Butyl Acetate Urethane Grade | 6.7 | 0 | 52.2 |
| n-Butyl Propionate | 48.0 | 55.1 | 0 |
| HELIOGEN ® Blue L 6700 F[30] | 1.2 | 0 | 9.5 |
| PALIOGEN ® Black L 0086[31] | 8.5 | 9.7 | 0 |
| Total formula weight | 100.0 | 100.0 | 100.0 |

[29]Acrylic dispersant used is described in U.S. Pat. No. 8,129,466.
[30]Commercially available from BASF Corporation (Ludwigshafen, Germany)
[31]Commercially available from BASF Corporation (Ludwigshafen, Germany)

Tint pastes TP1, TP2, and TP3 were prepared by combining components shown in Table 24, in order. The tint paste was dispersed with Potter's Glass Spheres P2227 grind media for 16 hours using a Lau disperser DAS 200. The media was sieved to remove fractions smaller than 75 microns and loaded at 200% of sample weight. The media was removed from grind paste via filtration to give the final tint pastes.

Example 20

Near-IR transparent single-stage Topcoat A components were prepared using the components listed in Table 25.

TABLE 25

Near-IR Transparant Single-Stage Topcoat A Components

| Component | TCA1 (B31) (kg) | TCA2 (B32) (kg) |
| --- | --- | --- |
| TP1 (from Example 19) | 52.1 | 0 |
| TP2 (from Example 19) | 0 | 45.5 |
| TP3 (from Example 19) | 0 | 6.6 |
| Acrylic Resin[32] | 13.6 | 13.6 |
| Polyester Resin[33] | 16.1 | 16.1 |
| Aromatic Solvent 100 Type | 1.4 | 1.4 |
| n-Butyl Acetate Urethane Grade | 3.7 | 3.7 |
| Polyester Resin[34] | 12.6 | 12.6 |

TABLE 25-continued

Near-IR Transparant Single-Stage Topcoat A Components

| Component | TCA1 (B31) (kg) | TCA2 (B32) (kg) |
|---|---|---|
| BYK-300[35] | 0.1 | 0.1 |
| TINUVIN ® 123[36] | 0.4 | 0.4 |
| Total formula weight | 100.0 | 100.0 |

[32]Acrylic resin used is described in U.S. Pat. No. 6,306,505 Example A
[33]Polyester resin is a polyester from Cardura E 10-P (commercially available form Hexion (Columbus, OH)), phthalic anhydride and trimethylol propane with a 70% solids content in methyl ether propylene glycol acetate/Aromatic solvent 100 type (83.5/16.5); with a hydroxyl value of 54 mg KOH/g; with an acid value of 9.5 mg KOH/g; with a Gardner viscosity of Z
[34]Saturated hydroxylated polyester resin available from Galstaff MultiResine (Mornago, Italy)
[35]Commercially available from BYK Additives and Instruments (Wesel, Germany)
[36]Commercially available from BASF Corporation (Ludwigshafen, Germany)

Tint pastes were then combined with the liquid formulation components and complete Component A formulations were then shaken on the Lau disperser for 30 minutes. Commercial PPG medium solids hardener F3270 and medium reducer F3330 were mixed with these Component A formulations, as well as with DELFLEET® Evolution single-stage topcoat FDG9000 Component A using volume ratios shown in Table 26.

TABLE 26

Volume Ratios for Single-Stage Topcoats SSTC1, SSTC2, and FDG9000

| Component | SSTC1 | SSTC2 | FDG9000 |
|---|---|---|---|
| TCA1 | 4 | 0 | 0 |
| TCA2 | 0 | 4 | 0 |
| DELFLEET ® Evolution FDG9000 Component A [37] | 0 | 0 | 4 |
| Medium Solids Hardener F3270 | 1 | 1 | 2 |
| Medium Thinner F3330 | 1 | 1 | 1 |

[37] Commercially available from PPG Industries, Inc. (Pittsburgh, PA)

Example 21

Conventional and near-IR reflective coating stacks were prepared using the components listed in Table 27.

TABLE 27

Coating Stack

| Component | Conventional Coating Stack | Near-IR Reflective Coating Stack |
|---|---|---|
| Substrate | ACT CRS[38] | ACT CRS[38] |
| Primer | WP[39] | WP[39] |
| Single-Stage Topcoat | DELFLEET ® Evolution FDG9000[40] | SSTC1 or SSTC2 |

[38]Commercially available from ACT (Hillsdale, MI)
[39]White primer from Example 18
[40]Polyurethane single-stage topcoat commercially available from PPG Industries Inc. (Pittsburgh, PA)

Prior to applying the coating composition, clean only cold-rolled steel substrate panels were cleaned with OneChoice SXA330 degreaser. A tack rag was run over the panels prior to spraying. The white primer was then spray applied to the prepared substrate panels using an air atomized HVLP gun with a 1.8 mm spray tip. A flash time of 10 minutes in between coats was used and coated panels were allowed to stand under ambient conditions for at least an hour. The dry film thickness (DFT) of the primer was approximately 2.3 mils.

Topcoats were applied using a HVLP spray gun with a 1.4 mm tip at a pressure of 30 psi. Two coats were applied for a DFT of approximately 1.5 mils. Coatings were ambient cured.

Example 22

Coatings described in Example 20 were spray applied over black and white opacity charts (BYK Leneta) according to Example 21 and measured for opacity according to Example 9. Dry film thicknesses for coatings described in Example 20 used to achieve opacity were 1.5 mils.

Example 23

Coatings from Example 22 were color matched according to Example 10. A BYK-mac i spectrophotometer was used to evaluate conventional and near-IR systems. Values of ΔE were reported for single-stage topcoats from Example 20 (Table 28).

TABLE 28

ΔE Values for Topcoats

| Topcoats | ΔE |
|---|---|
| SSTC1 | 1.0 |
| SSTC2 | 1.1 |

Example 24

The near-IR reflection of coating stacks were characterized according to Example 11:

Conventional and near-IR reflective coating stacks described in and prepared according to Example 21 and characterized according to Examples 22 and 23 were used for total solar reflectance measurements. Conventional and near-IR reflective coating stacks (primer, topcoat) are represented as "WP-SSTC1" and "WP-SSTC2" and described in Table 29.

TABLE 29

Reflectance Measurements of Full Coating Stacks at Near-IR Wavelengths

| | | Percent Reflectance | |
|---|---|---|---|
| Coating Stack | Description | Total Near-IR (700-2500 nm) | 905 nm |
| WP-SSTC1 | Near-IR with white primer | 53.9 | 77.9 |
| WP-SSTC2 | Near-IR with white primer | 56.1 | 80.8 |
| WP-FDG9000 | Conventional with white primer | 3.6 | 3.7 |

Example 25

Coating compositions were prepared including the components listed in Table 30. For each coating composition, the component or components listed as 1a-1k were premixed to form the pigmented base coating component. Components 2 and 3, the activator and thinner, were then added and the coating composition mixed to uniformity just prior to application.

TABLE 30

| Component | Grey 1 | Grey 2 | Grey 3 | Grey 4 | Grey 5 | Comp. White 1 | Comp. White 2 | Comp. Grey 1 | Comp. Purple 1 | Comp. Green 1 |
|---|---|---|---|---|---|---|---|---|---|---|
| 1a Untinted White Base[41] | 58.62 | 58.34 | — | — | 49.81 | — | — | — | 48.59 | 48.4 |
| 1b IR Transparent Black Base[42] | 0.5 | 0.78 | — | — | 9.38 | — | — | — | — | — |
| 1c Yellow Tint Base[43] | 0.04 | 0.04 | — | — | — | — | — | — | — | — |
| 1d Red Tint Base[44] | 0.01 | 0.01 | — | — | — | — | — | — | — | — |
| 1e Tinted Grey Base[45] | — | — | 59.17 | — | — | — | — | — | — | — |
| 1f Tinted Grey Base[46] | — | — | — | 59.19 | — | — | — | — | — | — |
| 1g Tinted White Base[47] | — | — | — | — | — | 59.17 | — | — | — | — |
| 1h Tinted White Base (with Carbon Black)[48] | — | — | — | — | — | — | 59.19 | — | — | — |
| 1i Tinted Grey Base (with Carbon Black)[49] | — | — | — | — | — | — | — | 59.19 | — | — |
| 1j IR Transparent Purple[50] | — | — | — | — | — | — | — | — | 9.15 | — |
| 1k IR Transparent Green[51] | — | — | — | — | — | — | — | — | — | 9.11 |
| 2 Activator[52] | 22.98 | 22.98 | 22.98 | 22.97 | 22.97 | 22.98 | 22.97 | 22.97 | 23.79 | 23.92 |
| 3 Thinner[53] | 17.85 | 17.85 | 17.85 | 17.84 | 17.84 | 17.85 | 17.84 | 17.84 | 18.47 | 18.57 |

[41]Pigmented polyol base component commercially available from PPG Aerospace PRC-DeSoto as DESOTHANE ® HS CA8000/BAC7067 (Sylmar, CA).
[42]Pigmented polyol base component commercially available from PPG Aerospace PRC-DeSoto as DESOTHANE ® HS CA8000/SR8000 (Sylmar, CA). Includes a mixture of Components 1j and 1k.
[43]Pigmented polyol base component at approximately 76% solids in solvent and a P:B = 1.39 with binder including a blend of approximately 68% polyester polyol (100% active, hydroxyl number = 230) and 32% polycaprolactone (100% active, hydroxyl value = 218), pigments including approximately 44% yellow iron oxide (PY42) and 56% barium sulfate and a mixture of additives such as dispersants, UV protection package, anti-settling modifiers and other common additives known to those familiar with the art (Sylmar, CA).
[44]Pigmented tint base component at approximately 73% solids in solvent and a P:B = 1.03 with binder includin a blend of approximately 68% polyester polyol (100% active, hydroxyl number = 230) and 32% polycaprolactone (100% active, hydroxyl value = 218), pigments includin approximately 24% quinacridone red (PV19) and 76% barium sulfate and a mixture of additives such as dispersants, UV protection package, anti-settling modifiers and other common additives known to those familiar with the art (Sylmar, CA).
[45]Pigmented polyol base component commercially available from PPG Aerospace PRC-DeSoto as DESOTHANE ® HS CA8000/SR1343 (Sylmar, CA). Component 1e included a mixture of Components 1a and 1b.
[46]Pigmented polyol base component commercially available from PPG Aerospace PRC-DeSoto as DESOTHANE ® HS CA8000/BAC2001 (Sylmar, CA). Component 1f included a mixture of Components 1a and 1b.
[47]Pigmented polyol base component commercially available from PPG Aerospace PRC-DeSoto as DESOTHANE ® HS CA8000/SR1408 (Sylmar, CA).
[48]Pigmented polyol base component commercially available from PPG Aerospace PRC-DeSoto as DESOTHANE ® HS CA8000/BAC70846 (Sylmar, CA). Component 1h included carbon black.
[49]Pigmented polyol base component commercially available from PPG Aerospace PRC-DeSoto as DESOTHANE ® HS CA8000/BAC707 (Sylmar, CA). Component 1i included carbon black.
[50]Pigmented dispersion component prepared in a manner consistent with U.S. Pat. No. 9,057,835 B2 Example 2. Component 1j included TiO$_2$.
[51]Pigmenteddispersion component prepared in a manner consistent with U.S. Pat. No. 9,057,835 B2 Example 6. Component 1j included TiO$_2$.
[52]Isocyanate oligomer based hardener component commercially available from PPG Aerospace PRC-DeSoto as DESOTHANE ® HS CA8000B Activator (Sylmar, CA).
[53]Solvent based thinner component commercially available from PPG Aerospace PRC-DeSoto as CA8000C (Sylmar, CA).

Example 26

Table 31 compares several of the coating compositions prepared in Example 25 (the grey primer made using a combination of infrared transparent black pigments (Grey 3) and the grey primer made using carbon black (Comp. Grey 1)).

TABLE 31

| | Grey 3 | Comp. Grey 1 |
|---|---|---|
| % Total Solar Reflectance | 72 | 43 |
| Difference in % TSR | 29 | — |
| % Improvement in % TSR | 40 | — |
| Maximum Temperature Measured Under Heat Lamp ° F. (° C.) | 153.9 (67.7) | 173.0 (78.3) |
| Difference in Temperature ° F. (° C.) | 19.1 (10.6) | — |
| % Improvement in Maximum Temperature | 11 | — |

The samples from Table 31 were prepared as follows: 1 mil (25.4 microns) of a carbon black paint (commercially available from PPG Aerospace PRC-DeSoto as DESOTHANE® HS CA8000/BAC701 (Sylmar, Calif.)) was applied to 3"×6" panels of 2024 T3 aluminum to mimic the near-IR absorption of a carbon fiber composite substrate. On top of this was applied 0.8 mils (20.32 microns) of a chrome free primer (commercially available as DESOPRIME® CF/CA7502A from PPG Aerospace PRC-De-Soto (Sylmar, Calif.)). The coating compositions were spray applied thereover by hand using a Binks Mach 3 HVLP type spray gun and a 95AS spray cap to a dry film thickness that provided full hiding. Percent Total Solar Reflectance (% TSR) was measured using a LAMBDA 950 S ultraviolet/visible/near-IR spectrophotometer (PerkinElmer®) following ASTM E903-12.

The maximum temperature reached under a heat lamp was also measured. This was carried out using a testing apparatus defined in ASTM B4803-10 including an insulated wooden box, IR lamp and a digital thermometer using a Type J thermocouple. The two panels were placed side-by-side, but not in contact, 15.5 inches directly under the IR lamp and monitored for temperature until both panels reached a maximum temperature, which did not increase any further. Comp. Grey 1 reflected 43% of the total solar radiation, whereas Grey 3 reflected 72%, for a relative increase in performance of 44%. The samples coated with Grey 3 had a maximum temperature that was 19.1° F. (10.6° C.) less than Comp. Grey 1.

Example 27

Several of the coating compositions prepared in Example 25 were applied to full hiding over a byko-chart Brushout 5DX Card (Byk-Gardner catalog No. 2856). The samples were then characterized for CIELAB color using an integrated sphere with D65 Illumination and 10° observer with specular included on a Datacolor600™ spectrophotometer to measure L*, a*, b*, C*, h°, and ΔE* color values. In the CIELAB color system, L* represents lightness/darkness on a scale of 0=pure black to 100=diffuse white, a* represents the balance of green −a* to red +a*, b* represents the balance of blue −b* to yellow +b*, C* represents chroma, and h° represents hue angle. The ΔE* value represents the three dimensional color model difference between two colors. Table 32 shows the CIELAB characterizations for the prepared samples.

TABLE 32

|  | Grey 5 | Comp. Purple 1 | Comp. Green 1 |
|---|---|---|---|
| Absolute L* | 78.11 | 67.72 | 80.97 |
| Absolute a* | −0.82 | 9.32 | −3.97 |
| Absolute b* | −3.73 | −16.91 | −0.32 |
| Absolute C* | 3.82 | 19.31 | 3.98 |
| Absolute h° | 258 | 299 | 185 |
| ΔL* | — | −10.39 | 2.86 |
| ΔC* | — | 15.49 | 0.16 |
| Δh° | — | 41 | −73 |
| ΔE* (CIE76) | — | 19.61 | 5.45 |

The grey color in Grey 5 (from Example 25) was achieved by blending two infrared transparent pigments (perylene pigments) as demonstrated by the measurements included in Table 32. Grey 5 blended a green-shade perylene pigment and a purple-shade perylene pigment.

Each of the individual perylene pigments in Comp. Purple 1 and Comp. Green 1 utilized alone at a high enough concentration and applied at a suitable dry film thickness yields a coating that appears black to the human eye. However, when the perylene pigment is utilized in combination with titanium dioxide (as in Comp. Purple 1 and Comp. Green 1 of Example 25) in a single coating, one IR transparent black pigment results in a purple shade, and the other results in a green shade. This is illustrated by comparing Grey 5 with Comp. Purple 1 and Comp. Green 1. Grey 5 is a neutral grey made using a blend of the two IR transparent black pigments. For Comp. Purple 1 and Comp. Green 1, that blend was replaced with an equivalent amount by weight of just the individual pigment tints.

Table 32 shows that there is a difference in color between Grey 5 and Comp. Purple 1, with a ΔE of 19.61 and a difference in color between Grey 5 and Comp. Green 1, with a ΔE of 5.45. The L*, a*, and b* values indicate that Grey 5 exhibits an off-white or grey shade, while the L* and h° indicate that Comp. Purple 1 exhibits a purple shade and Comp. Green 1 exhibits a green shade.

Example 28

Several coating compositions from Example 25 were applied over a different substrate and coating stack as follows. An untinted white basecoat (commercially available from PPG Aerospace PRC-DeSoto as DESOTHANE® HS CA8000/BAC7067 (Sylmar, Calif.)) was sprayed over an aluminized paper (commercially available as part 20PAP10X15SV from Alufoil Products Co., Inc. (Hauppauge, N.Y.)). The coating compositions were spray applied thereover by hand using a Binks Mach 3 HVLP type spray gun and a 95AS spray cap to a dry film thickness that provided full hiding. Hiding was determined using ASTM D6762 on Leneta black and white hide strips. The cured film coating density for the samples in Table 33 was 1.57 g/cc. The CIELAB color characterizations for these samples, % TSR, and the thickness required for full hiding are shown in Table 33.

TABLE 33

|  | Comp. White 2 | Comp. Grey 1 | Grey 1 | Grey 2 | Grey 3 | Grey 4 |
|---|---|---|---|---|---|---|
| Absolute L* Value | 95.59 | 78.07 | 93.03 | 91.71 | 90.34 | 77.80 |
| Absolute a* Value | −0.72 | −1.88 | −0.88 | −0.87 | −0.84 | −1.88 |
| Absolute b* Value | 1.10 | 0.69 | 0.17 | −0.40 | −0.82 | 0.69 |
| Absolute C* | 1.31 | 2.00 | 0.90 | 0.96 | 1.17 | 2.00 |
| Absolute h° | 123 | 160 | 169 | 205 | 224 | 160 |
| % Total Solar Reflectance | 84 | 44 | 82 | 80 | 79 | 69 |
| Dry Film Thickness of Coating Required to Provide Full Hiding (mils) | 2.65 | 1.45 | 2.45 | 2.05 | 1.53 | 1.45 |
| Weight of Cured Coating at Full Hiding Thickness to Cover Wing (kg) | 38 | 21 | 35 | 29 | 22 | 21 |

Given an aircraft wing with a surface area of 360.5 m², typical for a Boeing 787 type aircraft using carbon fiber composite materials, this thin layer of coating would result in a range of 21-38 kg of paint on the aircraft wing, as shown in Table 33. In order to maximize the % TSR, it would be necessary to apply a thicker layer and incur a significant weight penalty. Thus, Comp. White 2, while having the best % TSR, would add a prohibitive amount of weight. Meanwhile, Comp. Grey 1 would have the lowest weight, but has a comparatively low % TSR.

Example 29

The samples shown in Table 34 (using coating compositions from Example 25) were prepared as described in Example 26, with a black coating followed by a primer coating and then finally Grey 3 or Comp. White 1. An additional sample was prepared by spraying Comp. White 1 as the highly solar reflective under-layer while Grey 3 was sprayed on top of it as the pigmented topcoat, resulting in a two layer coating system. Hiding was determined using ASTM D6762 on Leneta black and white hide strips. Results from these samples are shown in Table 34.

TABLE 34

|  | Grey 3 Single Layer | Comp. White 1 Layer | Grey 3 over Comp. White 1 Two Layers |
|---|---|---|---|
| % TSR | 72 | 80 | 75 |
| Dry Film Thickness of Coating Required to Provide Full Hiding (mils) | 1.8 | 2.8 | 4.0 |
| Cured Film Coating Density (g/cc) | 1.57 | 1.57 | 1.57 |
| Approximate Surface Area of Boeing 787 Wing (m²) | 360.5 | 360.5 | 360.5 |
| Weight of Cured Coating at Full Hiding Thickness to Cover Wing (kg) | 25.9 | 40.3 | 57.5 |
| Weight Savings vs. Two Layers (kg) | 31.6 | — | — |
| % Weight Savings | 55 | — | — |

Comparing the % TSR, using the two layer system does result in an increase from Grey 3 at 72 to the two layer system at 75. However with the two layer system, the total thickness of the two layers is 4.0 mils compared to 1.8 mils for Grey 3. Therefore, Grey 3 demonstrates a weight saving of 55% over the Gray 3 over Comp. White 1 without a significant loss of % TSR.

The present invention further includes subject matter of the following clauses.

Clause 1: A method for increasing a detection distance of a surface of an object illuminated by near-IR electromagnetic radiation, comprising: (a) directing near-IR electromagnetic radiation from a near-IR electromagnetic radiation source towards an object at least partially coated with a near-IR reflective coating that increases a near-IR electromagnetic radiation detection distance by at least 15% as measured at a wavelength in a near-IR range as compared to the same object coated with a color matched coating which absorbs more of the same near-IR radiation, wherein the color matched coating has a ΔE color matched value of 1.5 or less when compared to the near-IR reflective coating, as measured using an integrating sphere with D65 Illumination, 10° observer with specular component included; and (b) detecting reflected near-IR electromagnetic radiation reflected from the near-IR reflective coating.

Clause 2: The method of clause 1, wherein the near-IR reflective coating exhibits a CIELAB L* value of 35 or less as measured using an integrating sphere with D65 Illumination, 10° observer with specular component included.

Clause 3: The method of clause 1 or 2, wherein the near-IR reflective coating comprises at least one visibly-absorbing near-IR transparent pigment and/or dye.

Clause 4: The method of any of the preceding clauses, wherein the near-IR reflective coating is substantially free of carbon black.

Clause 5: The method of any of the preceding clauses, wherein the near-IR reflective coating comprises a first coating layer and a second coating layer.

Clause 6: The method of clause 5, wherein the first coating layer comprises at least one visibly-absorbing near-IR transparent pigment and/or dye and the second coating layer comprises at least one near-IR reflective pigment.

Clause 7: The method of clause 5 or 6, wherein the second coating layer underlies at least a portion of the first coating layer.

Clause 8: The method of any of clauses 5-7, wherein the second coating layer comprises: a film-forming resin; a plurality of near-IR transparent pigments and/or dyes dispersed in the film-forming resin, the plurality of near-IR transparent pigments and/or dyes comprising a first perylene pigment and a second perylene pigment different from the first perylene pigment; and a near-IR reflective pigment dispersed in the film-forming resin, the near-IR reflective pigment different from the first perylene pigment and the second perylene pigment, wherein the second coating layer exhibits an off-white or grey color, and wherein the second coating layer is substantially free of carbon black.

Clause 9: The method of any of clauses 5-8, wherein the second coating layer comprises: a film-forming resin; a plurality of colorants dispersed in the film-forming resin, the plurality of colorants comprising a near-IR transparent pigment or dye, wherein the near-IR transparent pigment or dye comprises a first near-IR transparent pigment or dye and a second near-IR transparent pigment or dye different from the first near-IR transparent pigment or dye; and a near-IR reflective pigment dispersed in the film-forming resin, the near-IR reflective pigment different from the first near-IR transparent pigment or dye and the second near-IR transparent pigment or dye, wherein the second coating layer exhibits an off-white or grey color, and wherein the second coating layer is substantially free of carbon black.

Clause 10: The method of any of the preceding clauses, wherein the object is a vehicle, road, road traffic safety product, signage, or clothing.

Clause 11: The method of any of the preceding clauses, wherein the near-IR reflective coating reflects at least 20% of the radiation at a wavelength in the near-IR range directed in step (a) at the object.

Clause 12: The method of any of the preceding clauses, wherein the near-IR reflective coating reflects electromagnetic radiation having at least one wavelength in the range of 700 nm to 2500 nm.

Clause 13: The method of any of the preceding clauses, wherein the near-IR reflective coating reflects electromagnetic radiation having at least one wavelength in the range of 900 nm to 1600 nm.

Clause 14: The method of any of clauses 5-13, further comprising a transparent clearcoat layer positioned over at least a portion of the first coating layer.

Clause 15: The method of any of clauses 10-14, wherein the object is a vehicle and the near-IR reflective coating covers at least 10 percent of an exterior surface area of the vehicle.

Clause 16: The method of any of the preceding clauses, wherein the near-IR electromagnetic radiation source and near-IR detector are coupled to a vehicle.

Clause 17: The method of any of the preceding clauses, wherein the near-IR reflective coating is capable of increasing the near-IR electromagnetic radiation detection distance by at least 25%.

Clause 18: The method of any of clauses 8-17, wherein the first perylene pigment comprises a green-shade perylene pigment and the second perylene pigment comprises a purple-shade perylene pigment.

Clause 19: The method of clause 8-18, wherein the second coating layer exhibits the following CIELAB values using an integrating sphere with D65 Illumination, 10° observer with specular component included: a L* value ranging from 40-95; an a* value ranging from −2 to 2; and a b* value ranging from −6 to 6.

Clause 20: The method of any of clauses 8-19, wherein the near-IR reflective pigment comprises titanium dioxide.

Clause 21: The method of clause 20, wherein the titanium dioxide is dispersed in the film-forming resin in powder form.

Clause 22: The method of any of clauses 8-21, wherein the second coating layer fully hides a surface of the object at a dry film thickness of less than or equal to 2.5 mils.

Clause 23: The method of any of the preceding clauses, wherein the object at least partially coated with the near-IR reflective coating increases the near-IR electromagnetic detection distance by at least 15%, as measured at 905 nm.

Clause 24: The method of any of the preceding clauses, wherein the object at least partially coated with the near-IR reflective coating increases the near-IR electromagnetic detection distance by at least 15% as measured at 1550 nm.

Clause 25: The method of any of the preceding clauses, wherein the near-IR reflective coating comprises at least one near-IR fluorescing pigment and/or dye.

Clause 26: The method of any of clauses 5-25, wherein the first and/or second coating layer comprises at least one near-IR fluorescing pigment and/or dye.

Clause 27: The method of any of clauses 5-26, wherein the first coating layer is a top layer of the near-IR reflective coating.

Clause 28: A system for detecting proximity of vehicles, comprising: a first vehicle at least partially coated with a near-IR reflective coating that increases a near-IR electromagnetic radiation detection distance by at least 15% as measured at a wavelength in a near-IR range between the first vehicle and a second vehicle as compared to the first vehicle coated with a color matched coating which absorbs more of the near-IR radiation, wherein the color matched coating has a ΔE color matched value of 1.5 or less when compared to the near-IR reflective coating, as measured using an integrating sphere with D65 Illumination, 10° observer with specular component included.

Clause 29: The system of clause 28, wherein the near-IR reflective coating is substantially free of carbon black.

Clause 30: The system of clause 28 or 29, wherein the near-IR reflective coating covers at least 10 percent of an exterior surface area of the first vehicle.

Clause 31: The system of any of clauses 28-30, wherein the second vehicle comprises an electromagnetic radiation source and an electromagnetic radiation detector.

Clause 32: The system of any of clauses 28-31, wherein the near-IR reflective coating comprises at least one visibly-absorbing near-IR transparent pigment and/or dye.

Clause 33: The system of any of clauses 28-32, wherein the near-IR reflective coating comprises at least a first coating layer and a second coating layer, wherein the first coating layer comprises at least one visibly-absorbing near-IR transparent pigment and/or dye and the second coating layer comprises the at least one near-IR reflective pigment.

Clause 34: The system of any of clauses 28-33, wherein the near-IR reflective coating comprises a second coating layer positioned beneath a first coating layer comprising at least one visibly-absorbing near-IR transparent pigment and/or dye, wherein a second coating layer comprises: a film-forming resin; a plurality of near-IR transparent pigments and/or dyes dispersed in the film-forming resin, the plurality of near-IR transparent pigments and/or dyes comprising a first perylene pigment and a second perylene pigment different from the first perylene pigment; and a near-IR reflective pigment dispersed in the film-forming resin, the near-IR reflective pigment different from the first perylene pigment and the second perylene pigment, wherein the second coating layer exhibits an off-white or grey color, and wherein the second coating layer is substantially free of carbon black.

Clause 35: The system of any of clauses 28-34, wherein the near-IR reflective coating comprises a second coating layer positioned beneath a first coating layer comprising at least one visibly-absorbing near-IR transparent pigment and/or dye, wherein a second coating layer comprises: a film-forming resin; a plurality of colorants dispersed in the film-forming resin, the plurality of colorants comprising a near-IR transparent pigment or dye, wherein the near-IR transparent pigment or dye comprises a first near-IR transparent pigment or dye and a second near-IR transparent pigment or dye different from the first near-IR transparent pigment or dye; and a near-IR reflective pigment dispersed in the film-forming resin, the near-IR reflective pigment different from the first near-IR transparent pigment or dye and the second near-IR transparent pigment or dye, wherein the second coating layer exhibits an off-white or grey color, and wherein the second coating layer is substantially free of carbon black.

Clause 36: The system of any of clauses 28-35, wherein the near-IR reflective coating has a reflectance of at least 20% for electromagnetic radiation having a wavelength in a near-IR range.

Clause 37: The system of any of clauses 28-36, wherein the second vehicle is an autonomously operated vehicle.

Clause 38: The system of any of clauses 28-37, wherein the near-IR reflective coating has a reflectance of at least 70% for electromagnetic radiation having a wavelength in the near-IR range.

Clause 39: The system of any of clauses 28-38, wherein the near-IR reflective coating reflects electromagnetic radiation having at least one wavelength in the range of 700 nm-2500 nm.

Clause 40: The system of any of clauses 28-39, wherein the near-IR reflective coating reflects electromagnetic radiation having at least one wavelength in the range of 900 nm-1600 nm.

Clause 41: A system for detecting the proximity of a first vehicle to a second vehicle, comprising: (a) a first vehicle at least partially coated with a near-IR reflective coating that increases a near-IR electromagnetic radiation detection distance by at least 15% as measured at a wavelength in a near-IR range as compared to a vehicle coated with a similar color matched coating which absorbs more of the near-IR radiation, wherein the similar color matched coating has a ΔE color matched value of 1.5 or less when compared to the near-IR reflective coating, as measured using an integrating sphere with D65 Illumination, 10° observer with specular component included; and (b) a second vehicle comprising: (i) a near-IR electromagnetic radiation source that directs near-IR electromagnetic radiation towards the first vehicle; (ii) a near-IR detector that detects near-IR electromagnetic radiation reflected from the first vehicle; and (iii) a computing device that determines the detection distance between the first vehicle and second vehicle based in part on the detected near-IR electromagnetic radiation reflected from the first vehicle.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method for increasing a detection distance of a surface of an object illuminated by near-IR electromagnetic radiation, comprising:
   (a) directing near-IR electromagnetic radiation from a near-IR electromagnetic radiation source towards an object at least partially coated with a near-IR reflective coating that increases a near-IR electromagnetic radiation detection distance by at least 15% as measured at a wavelength in a near-IR range as compared to the same object coated with a color matched coating which absorbs more of the same near-IR radiation, wherein the color matched coating has a ΔE color matched value of 1.5 or less when compared to the near-IR reflective coating, as measured using an integrating sphere with D65 Illumination, 10° observer with specular component included; and
   (b) detecting reflected near-IR electromagnetic radiation reflected from the near-IR reflective coating.

2. The method of claim 1, wherein the near-IR reflective coating exhibits a CIELAB L* value of 35 or less as measured using an integrating sphere with D65 Illumination, 10° observer with specular component included.

3. The method of claim 1, wherein the near-IR reflective coating comprises at least one visibly-absorbing near-IR transparent pigment and/or dye.

4. The method of claim 1, wherein the near-IR reflective coating is substantially free of carbon black.

5. The method of claim 1, wherein the near-IR reflective coating comprises a first coating layer and a second coating layer.

6. The method of claim 5, wherein the first coating layer comprises at least one visibly-absorbing near-IR transparent pigment and/or dye and the second coating layer comprises at least one near-IR reflective pigment.

7. The method of claim 5, wherein the second coating layer underlies at least a portion of the first coating layer.

8. The method of claim 5, wherein the second coating layer comprises:
a film-forming resin;
a plurality of near-IR transparent pigments and/or dyes dispersed in the film-forming resin, the plurality of near-IR transparent pigments and/or dyes comprising a first perylene pigment and a second perylene pigment different from the first perylene pigment; and
a near-IR reflective pigment dispersed in the film-forming resin, the near-IR reflective pigment different from the first perylene pigment and the second perylene pigment,
wherein the second coating layer exhibits an off-white or grey color, and
wherein the second coating layer is substantially free of carbon black.

9. The method of claim 5, wherein the second coating layer comprises:
a film-forming resin;
a plurality of colorants dispersed in the film-forming resin, the plurality of colorants comprising a near-IR transparent pigment or dye, wherein the near-IR transparent pigment or dye comprises a first near-IR transparent pigment or dye and a second near-IR transparent pigment or dye different from the first near-IR transparent pigment or dye; and
a near-IR reflective pigment dispersed in the film-forming resin, the near-IR reflective pigment different from the first near-IR transparent pigment or dye and the second near-IR transparent pigment or dye,
wherein the second coating layer exhibits an off-white or grey color, and
wherein the second coating layer is substantially free of carbon black.

10. The method of claim 1, wherein the object is a vehicle, road, road traffic safety product, signage, or clothing.

11. The method of claim 1, wherein the near-IR reflective coating reflects at least 20% of the radiation at a wavelength in the near-IR range directed in step (a) at the object.

12. A system for detecting proximity of vehicles, comprising:
a first vehicle at least partially coated with a near-IR reflective coating that increases a near-IR electromagnetic radiation detection distance by at least 15% as measured at a wavelength in a near-IR range between the first vehicle and a second vehicle as compared to the first vehicle coated with a color matched coating which absorbs more of the near-IR radiation, wherein the color matched coating has a ΔE color matched value of 1.5 or less when compared to the near-IR reflective coating, as measured using an integrating sphere with D65 Illumination, 10° observer with specular component included.

13. The system of claim 12, wherein the near-IR reflective coating is substantially free of carbon black.

14. The system of claim 12, wherein the near-IR reflective coating covers at least 10 percent of an exterior surface area of the first vehicle.

15. The system of claim 12, wherein the second vehicle comprises an electromagnetic radiation source and an electromagnetic radiation detector.

16. The system of claim 12, wherein the near-IR reflective coating comprises at least one visibly-absorbing near-IR transparent pigment and/or dye.

17. The system of claim 12, wherein the near-IR reflective coating comprises at least a first coating layer and a second coating layer, wherein the first coating layer comprises at least one visibly-absorbing near-IR transparent pigment and/or dye and the second coating layer comprises the at least one near-IR reflective pigment.

18. The system of claim 12, wherein the near-IR reflective coating comprises a second coating layer positioned beneath a first coating layer comprising at least one visibly-absorbing near-IR transparent pigment and/or dye, wherein a second coating layer comprises:
a film-forming resin;
a plurality of near-IR transparent pigments and/or dyes dispersed in the film-forming resin, the plurality of near-IR transparent pigments and/or dyes comprising a first perylene pigment and a second perylene pigment different from the first perylene pigment; and
a near-IR reflective pigment dispersed in the film-forming resin, the near-IR reflective pigment different from the first perylene pigment and the second perylene pigment,
wherein the second coating layer exhibits An off-white or grey color, and
wherein the second coating layer is substantially free of carbon black.

19. The system of claim 12, wherein the near-IR reflective coating comprises a second coating layer positioned beneath a first coating layer comprising at least one visibly-absorbing near-IR transparent pigment and/or dye, wherein a second coating layer comprises:
a film-forming resin;
a plurality of colorants dispersed in the film-forming resin, the plurality of colorants comprising a near-IR transparent pigment or dye, wherein the near-IR transparent pigment or dye comprises a first near-IR transparent pigment or dye and a second near-IR transparent pigment or dye different from the first near-IR transparent pigment or dye; and
a near-IR reflective pigment dispersed in the film-forming resin, the near-IR reflective pigment different from the first near-IR transparent pigment or dye and the second near-IR transparent pigment or dye,
wherein the second coating layer exhibits an off-white or grey color, and
wherein the second coating layer is substantially free of carbon black.

20. The system of claim 12, wherein the near-IR reflective coating has a reflectance of at least 20% for electromagnetic radiation having a wavelength in a near-IR range.

21. The system of claim 12, wherein the second vehicle is an autonomously operated vehicle.

22. A system for detecting the proximity of a first vehicle to a second vehicle, comprising:
(a) a first vehicle at least partially coated with a near-IR reflective coating that increases a near-IR electromagnetic radiation detection distance by at least 15% as measured at a wavelength in a near-IR range as compared to a vehicle coated with a similar color matched coating which absorbs more of the near-IR radiation, wherein the similar color matched coating has a ΔE color matched value of 1.5 or less when compared to the near-IR reflective coating, as measured using an integrating sphere with D65 Illumination, 10° observer with specular component included; and (b) a second vehicle comprising:
  (i) a near-IR electromagnetic radiation source that directs near-IR electromagnetic radiation towards the first vehicle;
  (ii) a near-IR detector that detects near-IR electromagnetic radiation reflected from the first vehicle; and
  (iii) a computing device that determines the detection distance between the first vehicle and second vehicle based in part on the detected near-IR electromagnetic radiation reflected from the first vehicle.

* * * * *

UNITED STATES PATENT AND TRADEMARK OFFICE
CERTIFICATE OF CORRECTION

PATENT NO. : 10,215,855 B2
APPLICATION NO. : 15/796040
DATED : February 26, 2019
INVENTOR(S) : Eldon L. Decker et al.

It is certified that error appears in the above-identified patent and that said Letters Patent is hereby corrected as shown below:

In the Specification

Column 23

Lines 51-52, change "$Opacity = \left(\frac{L^* sample\ over\ white}{L^* sample\ over\ black}\right) \times 100$" to $Opacity = \left(\frac{L^* sample\ over\ black}{L^* sample\ over\ white}\right) \times 100$ Signed and Sealed this
Sixth Day of December, 2022

Katherine Kelly Vidal
*Director of the United States Patent and Trademark Office*